United States Patent
Wu et al.

(10) Patent No.: US 9,826,440 B2
(45) Date of Patent: Nov. 21, 2017

(54) NETWORK HANDOVER METHOD, DEVICE, AND SYSTEM

(71) Applicant: HUAWEI TECHNOlOGIES CO., LTD., Shenzhen (CN)

(72) Inventors: Xiaobo Wu, Shanghai (CN); Ye Zou, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 15/142,455

(22) Filed: Apr. 29, 2016

(65) Prior Publication Data

US 2016/0249257 A1    Aug. 25, 2016

Related U.S. Application Data

(63) Continuation of application No. PCT/CN2013/086452, filed on Nov. 1, 2013.

(51) Int. Cl.
| | | |
|---|---|---|
| *H04W 36/00* | (2009.01) | |
| *H04L 5/00* | (2006.01) | |
| *H04L 12/923* | (2013.01) | |
| *H04W 72/08* | (2009.01) | |
| *H04W 76/02* | (2009.01) | |
| *H04W 88/12* | (2009.01) | |
| *H04W 88/16* | (2009.01) | |

(52) U.S. Cl.
CPC ....... *H04W 36/0022* (2013.01); *H04L 5/0055* (2013.01); *H04L 47/762* (2013.01); *H04W 72/085* (2013.01); *H04W 76/02* (2013.01); *H04W 88/12* (2013.01); *H04W 88/16* (2013.01)

(58) Field of Classification Search
None
See application file for complete search history.

(56) References Cited

U.S. PATENT DOCUMENTS

2009/0268635 A1    10/2009 Gallagher et al.
2011/0009120 A1    1/2011 You et al.
(Continued)

FOREIGN PATENT DOCUMENTS

| CN | 101227677 A | 7/2008 |
|---|---|---|
| CN | 103118404 A | 5/2013 |
| EP | 2 461 627 A1 | 6/2012 |

OTHER PUBLICATIONS

International Search Report mailed Aug. 6, 2014, in corresponding International Application No. PCT/CN2013/086452.
(Continued)

*Primary Examiner* — Erika Washington
(74) *Attorney, Agent, or Firm* — Staas & Halsey LLP

(57) ABSTRACT

In a network handover method, after UE located on an LTE network initiates a request message that requests CSFB, an MME instructs an enodeB to move the UE from the LTE network to a 2G or 3G network, and requests an MSC to hand over the UE from the LTE network to a CS domain of the 2G or 3G network for the CSFB, so that the 2G or 3G network allocates a CS domain resource to the UE. Further, by determining that an IMS voice session does not exist, it is identified that the handover of the UE from the LTE network to the CS domain of the 2G or 3G network is triggered by the CSFB, so as to ensure that handover from the LTE network is properly performed.

18 Claims, 9 Drawing Sheets

(56) References Cited

U.S. PATENT DOCUMENTS

2012/0069731 A1* 3/2012 Tooher ............... H04W 76/026
                           370/221
2012/0122459 A1* 5/2012 Wu .................. H04W 36/0022
                           455/437

OTHER PUBLICATIONS

"$3^{rd}$ Generation Partnership Project; Technical Specification Group Services and System Aspects; Single Radio Voice Call Continuity (SRVCC); Stage 2 (Release 9)", 3GPPP TS 23.216 V9.0.0, $3^{rd}$ Generation Partnership Project, Jun. 2009, Valbonne, France, pp. 1-39.
"CSFB optimization based in SRVCC", 3GPP TSG-SA WG2 Meeting #75, S2-095143, Aug. 31-Sep. 4, 2009, Koyto, Japan, pp. 1-12.
"Change Request", 3GPP TSG-SA WG2 Meeting #75, S2-095144, Aug. 31-Sep. 4, 2009, Koyto, Japan, pp. 1-14.
International Search Report dated Aug. 6, 2014 in corresponding International Patent Application No. PCT/CN2013/086452.
European Search Report dated Oct. 18, 2016 in corresponding European Patent Application No. 13896585.0.
Extended European Search Report dated Feb. 6, 2017 in corresponding European Patent Application No. 13896585.0.

* cited by examiner

NETWORK HANDOVER METHOD, DEVICE, AND SYSTEM

CROSS-REFERENCE TO RELATED APPLICATIONS

This application is a continuation of International Application No. PCT/CN2013/086452, filed on Nov. 1, 2013, which is hereby incorporated by reference in its entirety.

TECHNICAL FIELD

The present invention relates to the field of communications technologies, and specifically, to a network handover method, device, and system.

BACKGROUND

Full coverage of a second generation (2G) or third generation (3G) network, such as Global System for Mobile Communications (GSM) or Wideband Code Division Multiple Access (WCDMA) has been basically implemented.

With development of Long Term Evolution (LTE) network technologies, LTE networks have covered some urban areas and traffic hot spot areas. In this way, on current communications networks, the LTE networks coexist with the 2G or 3G network.

During a call, user equipment (UE) may enter a 2G or 3G network from an LTE network, and handover from a packet switched (PS) domain to a circuit switched (CS) domain is required due to different bearer mechanisms of the LTE network and the 2G or 3G network, where interruption of a voice call may occur, and consequently, continuity of a voice call of a user is affected.

Circuit switched fallback (CSFB) is that when UE covered by LTE network processes a voice service, the UE first falls back to a network that has a CS domain, and processes the voice service on the network that has the CS domain, thereby fulfilling an objective of reusing an existing CS domain device to provide a traditional voice service for a user on the LTE network. In the prior art, the UE needs to be handed over from the LTE network to a PS domain of the 2G or 3G network, or to be redirected from the LTE network to the 2G or 3G network, and then initiates, on the 2G or 3G network, a connection to the CS domain. In the prior art, even though the UE and the network can support handover from the LTE network to the CS domain of the 2G or 3G network, the UE needs to be moved to the PS domain of the 2G or 3G network so as to initiate a voice call, which causes relatively long duration of an entire voice call and poor user experience.

SUMMARY

To resolve the foregoing problem in the prior art, embodiments of the present invention provide a network handover method, and in a process of implementing CSFB, handover of UE from an LTE network to a CS domain of a 2G or 3G network is triggered, thereby reducing an access delay of accessing the CS domain of the 2G or 3G network by the UE, and also improving user experience. In addition, by determining that an IMS voice session does not exist, it is identified that the handover of the UE from the LTE network to the CS domain of the 2G or 3G network is triggered by the CSFB, so as to ensure that an enodeB can still trigger the handover from the LTE network to the CS domain of the 2G or 3G network for the CSFB according to a handover capability of the UE in a case in which there is no voice bearer whose QCI=1. In addition, it is ensured that an MME/MSC can properly perform the handover from the LTE network to the CS domain of the 2G or 3G network in a case in which there is no IMS voice session. The embodiments of the present invention further provide a corresponding device and system.

A first aspect of the present invention provides a network handover method, including:

receiving, by a mobility management entity MME, a request message sent by user equipment UE located on a Long Term Evolution LTE network, where the request message is used to request circuit switched fallback CSFB;

sending, by the MME, a notification message to an evolved NodeB eNodeB according to the request message, where the notification message is used to instruct the eNodeB to move the UE from the LTE network to a circuit switched CS domain of a second generation 2G or third generation 3G network for the CSFB;

receiving, by the MME, a handover requirement message sent by the eNodeB;

determining, by the MME, that an IMS voice session of the UE does not exist and determining not to delete a bearer corresponding to the IMS voice session; and sending, by the MME, a first handover request message to a mobile switching center MSC, where the first handover request message is used to request the MSC to hand over the UE from the LTE network to the CS domain of the 2G or 3G network for the CSFB, so that the 2G or 3G network allocates a CS domain resource to the UE, and the CS domain resource is used to hand over the UE from the LTE network to the CS domain of the 2G or 3G network.

With reference to the first aspect of the present invention, a first implementation manner of the first aspect of the present invention includes:

the notification message is further used to indicate that the LTE network, the 2G or 3G network, and the UE support the handover of the UE from the LTE network to the CS domain of the 2G or 3G network for the CSFB; or the handover requirement message is further used to indicate that the UE supports the handover from the LTE network to the CS domain of the 2G or 3G network; or the first handover request message is further used to indicate that the UE supports the handover from the LTE network to the CS domain of the 2G or 3G network.

With reference to the first implementation manner of the first aspect of the present invention, a second implementation manner of the first aspect of the present invention includes: the notification message includes indication information, where the indication information is used to indicate that the LTE network, the 2G or 3G network, and the UE support the handover of the UE from the LTE network to the CS domain of the 2G or 3G network for the CSFB.

With reference to the second implementation manner of the first aspect of the present invention, a third implementation manner of the first aspect of the present invention includes: the indication information is used to indicate that the LTE network, the 2G or 3G network, and the UE support single radio voice call continuity SRVCC handover.

With reference to the first aspect of the present invention, the first implementation manner of the first aspect of the present invention, the second implementation manner of the first aspect of the present invention, or the third implementation manner of the first aspect of the present invention, a fourth implementation manner of the first aspect of the present invention includes:

determining, by the MME, that the LTE network and the 2G or 3G network support the handover of the UE from the LTE network to the CS domain of the 2G or 3G network for the CSFB and the UE supports the handover from the LTE network to the CS domain of the 2G or 3G network.

With reference to the first aspect of the present invention, the first implementation manner of the first aspect of the present invention, the second implementation manner of the first aspect of the present invention, the third implementation manner of the first aspect of the present invention, or the fourth implementation manner of the first aspect of the present invention, a fifth implementation manner of the first aspect of the present invention includes:

receiving, by the MME, a first handover response message that is sent by the MSC to respond to the first handover request message, where the first handover response message includes information about a CS domain radio resource allocated by a base station on the 2G or 3G network to the UE; and sending, by the MME, a handover requirement response message to the eNodeB, where the handover requirement response message includes the information about the CS domain radio resource, and the information about the CS domain radio resource is used to hand over the UE from the LTE network to the CS domain of the 2G or 3G network for the CSFB.

With reference to the first aspect of the present invention, the first implementation manner of the first aspect of the present invention, the second implementation manner of the first aspect of the present invention, the third implementation manner of the first aspect of the present invention, the fourth implementation manner of the first aspect of the present invention, or the fifth implementation manner of the first aspect of the present invention, a sixth implementation manner of the first aspect of the present invention includes:

the handover requirement message is a message for requiring handover from the LTE network to a packet switched PS domain of the 2G or 3G network, or a message for requiring the handover from the LTE network to the CS domain of the 2G or 3G network.

With reference to the first aspect of the present invention, the first implementation manner of the first aspect of the present invention, the second implementation manner of the first aspect of the present invention, the third implementation manner of the first aspect of the present invention, the fourth implementation manner of the first aspect of the present invention, or the fifth implementation manner of the first aspect of the present invention, a seventh implementation manner of the first aspect of the present invention includes:

the handover requirement message is a message for requiring handover from the LTE network to a PS domain and the CS domain of the 2G or 3G network.

With reference to the seventh implementation manner of the first aspect of the present invention, an eighth implementation manner of the first aspect of the present invention includes:

sending, by the MME, a second handover request message to a serving general packet radio service support node SGSN, where the second handover request message is used to request the SGSN to hand over the UE from the LTE network to the PS domain of the 2G or 3G network for the CSFB.

With reference to the first aspect of the present invention, the first implementation manner of the first aspect of the present invention, the second implementation manner of the present invention, the third implementation manner of the first aspect of the present invention, the fourth implementation manner of the first aspect of the present invention, the fifth implementation manner of the first aspect of the present invention, the sixth implementation manner of the first aspect of the present invention, the seventh implementation manner of the first aspect of the present invention, or the eighth implementation manner of the first aspect of the present invention, a ninth implementation manner of the first aspect of the present invention includes:

the bearer corresponding to the IMS voice session is a bearer whose QoS class identifier equals to 1.

A second aspect of the present invention provides a network handover method, including:

receiving, by an evolved NodeB eNodeB located on a Long Term Evolution LTE network, a notification message sent by a mobility management entity MME, where the notification message is used to instruct the eNodeB to move user equipment from the LTE network to a circuit switched CS domain of a 2G or 3G network for circuit switched fallback CSFB;

determining, according to a capability of the UE, that the UE supports the handover from the LTE network to the CS domain of the 2G or 3G network;

determining, by the eNodeB, that an IMS voice session of the UE does not exist, and sending, by the eNodeB, a handover requirement message to the MME;

receiving, by the eNodeB, a handover requirement response message sent by the MME, where the handover requirement response message includes information about a CS domain radio resource, and the information about the CS domain radio resource is used to hand over the UE from the LTE network to the CS domain of the 2G or 3G network; and sending, by the eNodeB, a handover command to the UE, where the handover command is used to instruct that the UE be handed over from the LTE network to the CS domain of the 2G or 3G network, and the handover command includes the information about the CS domain radio resource.

With reference to the second aspect of the present invention, a first implementation manner of the second aspect of the present invention includes:

the notification message is further used to indicate that the LTE network, the 2G or 3G network, and the UE support the handover of the UE from the LTE network to the CS domain of the 2G or 3G network for the CSFB; or the handover command is used to instruct that the UE be handed over from the LTE network to the circuit switched CS domain of the 2G or 3G network for the CSFB.

With reference to the second aspect of the present invention or the first implementation manner of the second aspect of the present invention, a second implementation manner of the second aspect of the present invention includes:

the determining, by the eNodeB, that an IMS voice session of the UE does not exist includes:

determining, by the eNodeB by determining that a bearer whose QoS class identifier equals to 1 does not exist in the UE, that the IMS voice session of the UE does not exist.

With reference to the second aspect of the present invention, the first implementation manner of the second aspect of the present invention, or the second implementation manner of the second aspect of the present invention, a third implementation manner of the second aspect of the present invention includes:

the handover requirement message includes first indication information, where the first indication information is used to request the MME to hand over the UE from the LTE network to the CS domain of the 2G or 3G network for the CSFB; or the first indication information is used to request the MME to hand over the UE from the LTE network to the CS domain of the 2G or 3G network for the CSFB and is used to indicate that the UE supports the handover from the LTE network to the CS domain of the 2G or 3G network; or the handover requirement message includes a source-to-target transparent container, where the source-to-target transparent container includes second indication information, and the second indication information is used to request a base station on the 2G or 3G network to hand over the UE from the LTE network to the CS domain of the 2G or 3G network for the CSFB.

With reference to the third implementation manner of the second aspect of the present invention, a fourth implementation manner of the second aspect of the present invention includes:

the second indication information is further used to indicate that the UE supports the handover from the LTE network to the CS domain of the 2G or 3G network.

With reference to the second aspect of the present invention, the first implementation manner of the second aspect of the present invention, the second implementation manner of the second aspect of the present invention, the third implementation manner of the second aspect of the present invention, or the fourth implementation manner of the second aspect of the present invention, a fifth implementation manner of the second aspect of the present invention includes:

the handover requirement message is a message for requiring handover from the LTE network to a packet switched PS domain of the 2G or 3G network, or a message for requiring the handover from the LTE network to the CS domain of the 2G or 3G network.

With reference to the second aspect of the present invention, the first implementation manner of the second aspect of the present invention, the second implementation manner of the second aspect of the present invention, the third implementation manner of the second aspect of the present invention, or the fourth implementation manner of the second aspect of the present invention, a sixth implementation manner of the second aspect of the present invention includes:

the handover requirement message is a message for requiring handover from the LTE network to a PS domain and the CS domain of the 2G or 3G network.

With reference to the sixth implementation manner of the second aspect of the present invention, a seventh implementation manner of the second aspect of the present invention includes:

determining, by the eNodeB, that the UE supports handover from the LTE network to the PS domain of the 2G or 3G network, where the handover command is further used to instruct that the UE be handed over from the LTE network to the PS domain of the 2G or 3G network, the handover command includes information about a PS domain resource of the 2G or 3G network, and the information about the PS domain resource is used to hand over the UE from the LTE network to the PS domain of the 2G or 3G network.

A third aspect of the present invention provides a network handover method, including:

receiving, by a mobile switching center MSC, a first handover request message sent by a mobility management entity MME, where the first handover request message is used to request the MSC to hand over user equipment UE from a Long Term Evolution LTE network to a circuit switched CS domain of a second generation 2G or third generation 3G network for circuit switched fallback CSFB;

determining, by the MSC according to the first handover request message, not to initiate a session transfer process to an IP multimedia subsystem;

sending, by the MSC, a third handover request message to a base station on the 2G or 3G network, where the third handover request message is used to request the base station to allocate a CS domain resource to the UE for the handover to the CS domain of the 2G or 3G network;

receiving, by the MSC, a third handover request response message sent by the base station, where the third handover request response message includes information about a CS domain radio resource allocated by the base station to the UE for the handover to the CS domain of the 2G or 3G network;

sending, by the MSC, a first handover response message to the MME, where the first handover response message includes the information about the CS domain radio resource; and receiving, by the MSC, a handover complete message sent by the UE, where the handover complete message indicates that the UE has already completed the handover from the LTE network to the CS domain of the 2G or 3G network.

With reference to the third aspect of the present invention, a first implementation manner of the third aspect of the present invention includes: the first handover request message is further used to indicate that the UE supports the handover from the LTE network to the CS domain of the 2G or 3G network.

With reference to the third aspect of the present invention or the first implementation manner of the third aspect of the present invention, a second implementation manner of the third aspect of the present invention includes: receiving, by the MSC, a first CS call connection setup request message sent by the UE, where the first CS call connection setup request message is used to request the MSC to generate a first session.

With reference to the third aspect of the present invention or the first implementation manner of the third aspect of the present invention, a third implementation manner of the third aspect of the present invention includes:

sending, by the MSC, a second CS call connection setup request message to the UE, where the second CS call connection setup request message is used to request the UE to generate a second session.

With reference to the second implementation manner of the third aspect of the present invention, a fourth implementation manner of the third aspect of the present invention includes:

sending, by the MSC after receiving the first CS call connection setup request message, a session release message to the UE, where the session release message is used to request the UE to release a third session generated by the UE in a process of the handover from the LTE network to the CS domain of the 2G or 3G network.

With reference to the third implementation manner of the third aspect of the present invention, a fifth implementation manner of the third aspect of the present invention includes:

sending, by the MSC after receiving a call acknowledgement message that responds to the second CS call connection setup request message, a session release message to the UE, where the session release message is used to request the UE to release a third session generated by the UE in a process of the handover from the LTE network to the CS domain of the 2G or 3G network.

A fourth aspect of the present invention provides a network handover method, including:

sending, by user equipment UE located on a Long Term Evolution LTE network, a request message to a mobility management entity MME, where the request message is used to request circuit switched fallback CSFB;

receiving, by the UE, a handover command sent by an evolved NodeB eNodeB, where the handover command is used to instruct that the UE be handed over from the LTE network to a circuit switched CS domain of a 2G or 3G network for the CSFB, and the handover command includes information about a CS domain radio resource allocated by the 2G or 3G network to the UE for the handover from the LTE network to the CS domain of the 2G or 3G network;

handing over the UE from the LTE network to the CS domain of the 2G or 3G network according to the handover command; and generating, by the UE, a session after the UE is handed over from the LTE network to the CS domain of the 2G or 3G network.

With reference to the fourth aspect of the present invention, a first implementation manner of the fourth aspect of the present invention includes:

sending, by the UE, a CS call connection setup request message to a mobile switching center MSC, where the CS call connection setup request message is used to request the MSC to generate a session.

With reference to the fourth aspect of the present invention or the first implementation manner of the fourth aspect of the present invention, a second implementation manner of the fourth aspect of the present invention includes:

generating, by the UE, the session after receiving the CS call connection setup request message sent by the MSC.

With reference to the fourth aspect of the present invention, the first implementation manner of the fourth aspect of the present invention, or the second implementation manner of the fourth aspect of the present invention, a third implementation manner of the fourth aspect of the present invention includes: the handover command further includes information about a PS domain radio resource allocated by the 2G or 3G network to the UE for handover from the LTE network to a packet switched PS domain of the 2G or 3G network.

A fifth aspect of the present invention provides a mobility management entity MME, including:

a receiving unit, configured to receive a request message sent by user equipment UE located on a Long Term Evolution LTE network, where the request message is used to request circuit switched fallback CSFB;

a generation unit, configured to generate a notification message according to the request message received by the receiving unit, where the notification message is used to instruct an evolved NodeB eNodeB to move the UE from the LTE network to a circuit switched CS domain of a second generation 2G or third generation 3G network for the CSFB;

a sending unit, configured to send the notification message generated by the generation unit to the eNodeB; and a determining unit, configured to determine that an IMS voice session of the UE does not exist and determine not to delete a bearer corresponding to the IMS voice session, where the receiving unit is further configured to receive a handover requirement message sent by the eNodeB;

the generation unit is further configured to generate a first handover request message according to the handover requirement message received by the receiving unit, where the first handover request message is used to request an MSC to hand over the UE from the LTE network to the CS domain of the 2G or 3G network for the CSFB; and the sending unit is further configured to: when the determining unit determines that the IMS voice session of the UE does not exist, send the first handover request message generated by the generation unit to the mobile switching center MSC, so that the 2G or 3G network allocates a CS domain resource to the UE, where the CS domain resource is used to hand over the UE from the LTE network to the CS domain of the 2G or 3G network.

With reference to the fifth aspect of the present invention, a first implementation manner of the fifth aspect of the present invention includes:

the notification message is further used to indicate that the LTE network, the 2G or 3G network, and the UE support the handover of the UE from the LTE network to the CS domain of the 2G or 3G network for the CSFB; or the handover requirement message includes first indication information, where the first indication information is used to request the MME to hand over the UE from the LTE network to the CS domain of the 2G or 3G network for the CSFB; or the first indication information is used to request the MME to hand over the UE from the LTE network to the CS domain of the 2G or 3G network for the CSFB and is used to indicate that the UE supports the handover from the LTE network to the CS domain of the 2G or 3G network.

With reference to the first implementation manner of the fifth aspect of the present invention, a second implementation manner of the fifth aspect of the present invention includes: the notification message includes indication information, where the indication information is used to indicate that the LTE network, the 2G or 3G network, and the UE support the handover of the UE from the LTE network to the CS domain of the 2G or 3G network for the CSFB.

With reference to the second implementation manner of the fifth aspect of the present invention, a third implementation manner of the fifth aspect of the present invention includes:

the indication information is used to indicate that the LTE network, the 2G or 3G network, and the UE support single radio voice call continuity SRVCC handover.

With reference to the fifth aspect of the present invention, the first implementation manner of the fifth aspect of the present invention, the second implementation manner of the fifth aspect of the present invention, or the third implementation manner of the fifth aspect of the present invention, a fourth implementation manner of the fifth aspect of the present invention includes:

the determining unit is further configured to determine that the LTE network and the 2G or 3G network support the handover of the UE from the LTE network to the CS domain of the 2G or 3G network for the CSFB and the UE supports the handover from the LTE network to the CS domain of the 2G or 3G network.

With reference to the fifth aspect of the present invention, the first implementation manner of the fifth aspect of the present invention, the second implementation manner of the fifth aspect of the present invention, the third implementation manner of the fifth aspect of the present invention, or the fourth implementation manner of the fifth aspect of the present invention, a fifth implementation manner of the fifth aspect of the present invention includes:

the receiving unit is further configured to receive a first handover response message that is sent by the MSC to respond to the first handover request message, where the first handover response message includes information about a CS domain radio resource allocated by a base station on the 2G or 3G network to the UE;

the generation unit is further configured to generate a handover requirement response message according to the handover requirement message received by the receiving unit, where the handover requirement response message includes the information about the CS domain radio resource, and the information about the CS domain radio resource is used to hand over the UE from the LTE network to the CS domain of the 2G or 3G network for the CSFB; and the sending unit is further configured to send the handover requirement response message generated by the generation unit to the eNodeB.

With reference to the fifth aspect of the present invention, the first implementation manner of the fifth aspect of the present invention, the second implementation manner of the fifth aspect of the present invention, the third implementation manner of the fifth aspect of the present invention, the fourth implementation manner of the fifth aspect of the present invention, or the fifth implementation manner of the fifth aspect of the present invention, a sixth implementation manner of the fifth aspect of the present invention includes:

the handover requirement message is a message for requiring handover from the LTE network to a packet switched PS domain of the 2G or 3G network, or a message for requiring the handover from the LTE network to the CS domain of the 2G or 3G network.

With reference to the fifth aspect of the present invention, the first implementation manner of the fifth aspect of the present invention, the second implementation manner of the fifth aspect of the present invention, the third implementation manner of the fifth aspect of the present invention, the fourth implementation manner of the fifth aspect of the present invention, or the fifth implementation manner of the fifth aspect of the present invention, a seventh implementation manner of the fifth aspect of the present invention includes:

the handover requirement message is a message for requiring handover from the LTE network to a PS domain and the CS domain of the 2G or 3G network.

With reference to the seventh implementation manner of the fifth aspect of the present invention, an eighth implementation manner of the fifth aspect of the present invention includes:

the sending unit is further configured to send a second handover request message to a serving general packet radio service support node SGSN, where the second handover request message is used to request the SGSN to hand over the UE from the LTE network to the PS domain of the 2G or 3G network for the CSFB.

With reference to the fifth aspect of the present invention, the first implementation manner of the fifth aspect of the present invention, the second implementation manner of the fifth aspect of the present invention, the third implementation manner of the fifth aspect of the present invention, the fourth implementation manner of the fifth aspect of the present invention, the fifth implementation manner of the fifth aspect of the present invention, the sixth implementation manner of the fifth aspect of the present invention, the seventh implementation manner of the fifth aspect of the present invention, or the eighth implementation manner of the fifth aspect of the present invention, a ninth implementation manner of the fifth aspect of the present invention includes:

the bearer corresponding to the IMS voice session is a bearer whose QoS class identifier equals to 1.

A sixth aspect of the present invention provides an evolved NodeB eNodeB, including:

a receiving unit, configured to receive a notification message sent by a mobility management entity MME, where the notification message is used to instruct the eNodeB to move user equipment UE from a Long Term Evolution LTE network to a circuit switched CS domain of a 2G or 3G network for circuit switched fallback CSFB;

a generation unit, configured to generate a handover requirement message according to the notification message received by the receiving unit;

a determining unit, configured to determine, according to a capability of the UE, that the UE supports the handover from the LTE network to the CS domain of the 2G or 3G network, where the determining unit is further configured to determine that an IMS voice session of the UE does not exist; and a sending unit, configured to: when the determining unit determines that the IMS voice session of the UE does not exist, send the handover requirement message generated by the generation unit to the MME; where the receiving unit is further configured to receive a handover requirement response message sent by the MME, where the handover requirement response message includes information about a CS domain radio resource, and the information about the CS domain radio resource is used to hand over the UE from the LTE network to the CS domain of the 2G or 3G network;

the generation unit is further configured to generate a handover command according to the handover requirement response message received by the receiving unit, where the handover command is used to instruct that the UE be handed over from the LTE network to the CS domain of the 2G or 3G network, and the handover command includes the information about the CS domain radio resource; and the sending unit is further configured to send the handover command generated by the generation unit to the UE.

With reference to the sixth aspect of the present invention, a first implementation manner of the sixth aspect of the present invention includes:

the notification message is further used to indicate that the LTE network, the 2G or 3G network, and the UE support the handover of the UE from the LTE network to the CS domain of the 2G or 3G network for the CSFB; or the handover command is used to instruct that the UE be handed over from the LTE network to the circuit switched CS domain of the 2G or 3G network for the CSFB.

With reference to the sixth aspect of the present invention or the first implementation manner of the sixth aspect of the present invention, a second implementation manner of the sixth aspect of the present invention includes:

the determining unit is further configured to determine, by determining that a bearer whose QoS class identifier equals to 1 does not exist in the UE, that the IMS voice session of the UE does not exist.

With reference to the sixth aspect of the present invention, the first implementation manner of the sixth aspect of the present invention, or the second implementation manner of the sixth aspect of the present invention, a third implementation manner of the sixth aspect of the present invention includes:

the handover requirement message includes first indication information, where the first indication information is used to request the MME to hand over the UE from the LTE network to the CS domain of the 2G or 3G network for the CSFB; or the first indication information is used to request the MME to hand over the UE from the LTE network to the CS domain of the 2G or 3G network for the CSFB and is used to indicate that the UE supports the handover from the LTE network to the CS domain of the 2G or 3G network; or the handover requirement message includes a source-to-target transparent container, where the source-to-target transparent container includes second indication information, and the second indication information is used to request a base station on the 2G or 3G network to hand over the UE from the LTE network to the CS domain of the 2G or 3G network for the CSFB.

With reference to the third implementation manner of the sixth aspect of the present invention, a fourth implementation manner of the sixth aspect of the present invention includes:

the second indication information is further used to indicate that the UE supports the handover from the LTE network to the CS domain of the 2G or 3G network.

With reference to the sixth aspect of the present invention, the first implementation manner of the sixth aspect of the present invention, the second implementation manner of the sixth aspect of the present invention, the third implementation manner of the sixth aspect of the present invention, or the fourth implementation manner of the sixth aspect of the present invention, a fifth implementation manner of the sixth aspect of the present invention includes:

the handover requirement message is a message for requiring handover from the LTE network to a packet switched PS domain of the 2G or 3G network, or a message for requiring the handover from the LTE network to the CS domain of the 2G or 3G network.

With reference to the sixth aspect of the present invention, the first implementation manner of the sixth aspect of the present invention, the second implementation manner of the sixth aspect of the present invention, the third implementation manner of the sixth aspect of the present invention, or the fourth implementation manner of the sixth aspect of the present invention, a sixth implementation manner of the sixth aspect of the present invention includes:

the handover requirement message is a message for requiring handover from the LTE network to a PS domain and the CS domain of the 2G or 3G network.

With reference to the sixth implementation manner of the sixth aspect of the present invention, a seventh implementation manner of the sixth aspect of the present invention includes:

the determining unit is further configured to determine that the UE supports handover from the LTE network to the PS domain of the 2G or 3G network, where the handover command is further used to instruct that the UE be handed over from the LTE network to the PS domain of the 2G or 3G network, the handover command includes information about a PS domain resource of the 2G or 3G network, and the information about the PS domain resource is used to hand over the UE from the LTE network to the PS domain of the 2G or 3G network.

A seventh aspect of the present invention provides a mobile switching center MSC, including:

a receiving unit, configured to receive a first handover request message sent by a mobility management entity MME, where the first handover request message is used to request the MSC to hand over user equipment UE from a Long Term Evolution LTE network to a circuit switched CS domain of a second generation 2G or third generation 3G network for circuit switched fallback CSFB;

a generation unit, configured to generate a third handover request message according to the first handover request message received by the receiving unit, where the third handover request message is used to request a base station on the 2G or 3G network to allocate a CS domain resource to the UE for the handover to the CS domain of the 2G or 3G network;

a determining unit, configured to determine, according to the first handover request message received by the receiving unit, not to initiate a session transfer process to an IP multimedia subsystem; and a sending unit, configured to send the third handover request message generated by the generation unit to the base station, where the receiving unit is further configured to receive a third handover request response message sent by the base station, where the third handover request response message includes information about a CS domain radio resource allocated by the base station to the UE for the handover to the CS domain of the 2G or 3G network;

the generation unit is further configured to generate a first handover response message according to the first handover request message received by the receiving unit, where the first handover response message includes the information about the CS domain radio resource;

the sending unit is further configured to send the first handover response message generated by the generation unit to the MME; and the receiving unit is further configured to receive a handover complete message sent by the UE, where the handover complete message indicates that the UE has already completed the handover from the LTE network to the CS domain of the 2G or 3G network.

With reference to the seventh aspect of the present invention, a first implementation manner of the seventh aspect of the present invention includes: the first handover request message is further used to indicate that the UE supports the handover from the LTE network to the CS domain of the 2G or 3G network.

With reference to the seventh aspect of the present invention or the first implementation manner of the seventh aspect of the present invention, a second implementation manner of the seventh aspect of the present invention includes:

the receiving unit is further configured to receive a first CS call connection setup request message sent by the UE, where the first CS call connection setup request message is used to request the MSC to generate a first session.

With reference to the seventh aspect of the present invention or the first implementation manner of the seventh aspect of the present invention, a third implementation manner of the seventh aspect of the present invention includes:

the sending unit is further configured to send a second CS call connection setup request message to the UE, where the second CS call connection setup request message is used to request the UE to generate a second session.

With reference to the second implementation manner of the seventh aspect of the present invention, a fourth implementation manner of the seventh aspect of the present invention includes:

the sending unit is further configured to send a session release message to the UE after the receiving unit receives the first CS call connection setup request message, where the session release message is used to request the UE to release a third session generated by the UE in a process of the handover from the LTE network to the CS domain of the 2G or 3G network.

With reference to the third implementation manner of the seventh aspect of the present invention, a fifth implementation manner of the seventh aspect of the present invention includes:

the receiving unit is further configured to receive a call acknowledgement message of the second CS call connection setup request message; and the sending unit is further configured to send a session release message to the UE after the receiving unit receives the call acknowledgement message, where the session release message is used to request the UE to release a third session generated by the UE in a process of the handover from the LTE network to the CS domain of the 2G or 3G network.

An eighth aspect of the present invention provides user equipment UE, including:

a sending unit, configured to send a request message to a mobility management entity MME, where the request message is used to request circuit switched fallback CSFB;

a receiving unit, configured to receive a handover command sent by an evolved NodeB eNodeB, where the handover command is used to instruct that the UE be handed over from a Long Term Evolution LTE network to a circuit switched CS domain of a 2G or 3G network for the CSFB, and the handover command includes information about a CS domain radio resource allocated by the 2G or 3G network to the UE for the handover from the LTE network to the CS domain of the 2G or 3G network;

a handover unit, configured to hand over from the LTE network to the CS domain of the 2G or 3G network according to the handover command received by the receiving unit; and a session generation unit, configured to generate a session after the UE is handed over from the LTE network to the CS domain of the 2G or 3G network.

With reference to the eighth aspect of the present invention, a first implementation manner of the eighth aspect of the present invention includes:

the sending unit is further configured to send a CS call connection setup request message to a mobile switching center MSC, where the CS call connection setup request message is used to request the MSC to generate a session.

With reference to the eighth aspect of the present invention or the first implementation manner of the eighth aspect of the present invention, a second implementation manner of the eighth aspect of the present invention includes:

the session generation unit is configured to generate the session after the receiving unit receives the CS call connection setup request message sent by the MSC.

A ninth aspect of the present invention provides a network handover system, including a mobility management entity, an evolved NodeB, a mobile switching center, and user equipment, where the mobility management entity is the mobility management entity described in the foregoing fifth aspect;

the evolved NodeB is the evolved NodeB described in the foregoing sixth aspect;

the mobile switching center is the mobile switching center described in the foregoing seventh aspect; and the user equipment is the user equipment described in the foregoing eighth aspect.

In the embodiments provided in the present invention, in a process of implementing circuit switched fallback, handover from an LTE network to a 2G or 3G network is triggered, and UE can be handed over directly from the LTE network to a CS domain of the 2G or 3G network. Therefore, a resource is allocated on a network side to the UE for the handover from the LTE network to the CS domain of the 2G or 3G network, which avoids allocation of a CS domain resource for the CSFB after the UE is handed over from the LTE network to a PS domain of the 2G or 3G network or is redirected to the 2G or 3G network, reduces an access delay of accessing the CS domain of the 2G or 3G network by the UE, shortens entire voice call duration, and improves user experience.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons skilled in the art may still derive other drawings from these accompanying drawings without creative efforts.

DESCRIPTION OF EMBODIMENTS

Embodiments of the present invention provide a network handover method, and in a process of implementing circuit switched fallback, handover of UE from an LTE network to a CS domain of a 2G or 3G network is triggered, thereby reducing an access delay of accessing the CS domain of the 2G or 3G network by the UE, and also improving user experience. The embodiments of the present invention further provide a corresponding device and system. Detailed descriptions are separately given below.

Acronyms of some communications terms that are involved in the embodiments of the present invention include: mobility management entity (MME), evolved NodeB (eNodeB), user equipment (UE), mobile switching center (MSC), the $2^{nd}$ generation or $3^{rd}$ generation of mobile telecommunications technology (2rd Generation/3rd Generation, 2G or 3G), and base station (BS), Long Term Evolution (LTE), serving GPRS support node (SGSN), circuit switched fallback (CSFB), universal terrestrial radio access network (UTRAN), Global System for Mobile Communications (GSM), Enhanced Data rates for GSM Evolution (EDGE), and Global System for Mobile Communications/Enhanced Data rates for GSM Evolution radio access network (GSM/EDGE Radio Access Network, GERAN), where a base station in the embodiments of the present invention includes a base station controller (BSC) and a radio network controller (RNC).

"First", "second", "third", "fourth", "fifth", and the like, in the embodiments of the present invention are only used for distinguishing between indication information, messages, or other objects instead of representing a sequence relationship.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

Figure 1:
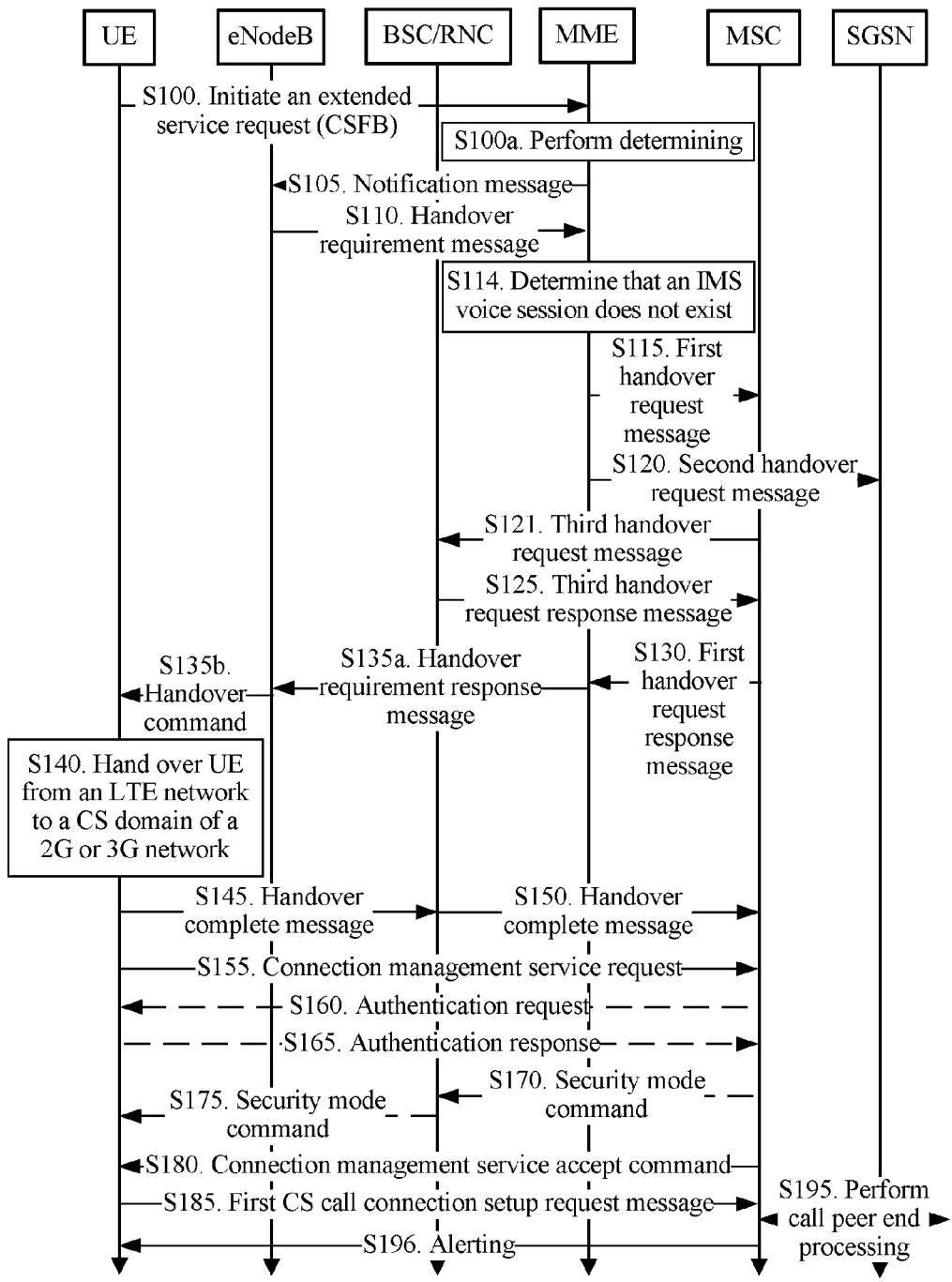
FIG. 1 is a schematic diagram of an embodiment of a network handover method according to an embodiment of the present invention.

Referring to FIG. 1, FIG. 1 shows a fallback process implemented by handing UE over from an LTE network to a 2G or 3G network and an active call process after the handover according to an embodiment of the present invention.

S100. The UE sends an extended service request to an MME, where the extended service request is used to request circuit switched fallback CSFB.

S100a. The MME may determine whether the LTE network and the 2G/3G network support handover of the UE from the LTE network to a CS domain of the 2G or 3G network for the CSFB.

Alternatively, the MME may not perform determining, but consider by default that communications networks support the handover of the UE from the LTE network to the CS domain of the 2G or 3G network for the CSFB, or may perform determining only on some of the networks.

The communications networks are the LTE network and the 2G or 3G network.

S105. The MME sends a notification message to an evolved NodeB eNodeB according to the extended service request, where the notification message is used to instruct the eNodeB to move the UE from the LTE network to the CS domain of the 2G or 3G network for the CSFB, that is, the notification message is used to instruct the enodeB that the UE should be moved to the 2G or 3G network for the CSFB.

When the MME determines that the LTE network and the 2G or 3G network support the handover of the UE from the LTE network to the CS domain of the 2G or 3G network for the CSFB, the MME may send the notification message to inform the eNodeB whether the LTE network and the 2G or 3G network support the handover of the UE from the LTE network to the CS domain of the 2G or 3G network for the CSFB, so that the eNodeB initiates a handover requirement of handing over the UE from the LTE network to the CS domain of the 2G or 3G network for the CSFB.

For example, the notification message may include indication information, where the indication information is used to indicate that the communications networks and the UE support the handover of the UE from the LTE network to the CS domain of the 2G or 3G network for the CSFB.

For example, the indication information may be indication information of single radio voice call continuity (single radio voice call continuity, SRVCC) handover, and is used to indicate that the LTE network and the 2G/3G network support handover of the UE from the LTE network to the 2G or 3G network for the CSFB.

The indication information in this embodiment of the present invention may be referred to as an optimized CSFB indicator, a single radio voice call continuity (SRVCC)-based CSFB indicator (SRVCC based CSFB Indicator), an enhanced CSFB indicator, an enhanced CSFB possibility indicator, or an SRVCC operation possibility indicator.

S110. The eNodeB sends a handover requirement message to the MME.

It is determined, according to a capability of the UE, that the UE supports the handover from the LTE network to the CS domain of the 2G or 3G network. At the same time, the eNodeB determines that an IMS voice session of the UE does not exist. The eNodeB sends the handover requirement message to the MME.

Specifically, the enodeB determines, according to an FGI (feature group indicator) reported by the UE, whether the UE supports a handover capability of being handed over from the LTE network to the CS domain of the 2G or 3G network. At the same time, the eNodeB determines that a bearer whose QCI=1 does not exist, so as to determine that the IMS voice session of the UE does not exist.

That is because in the prior art, the enodeB can send the handover requirement message to the MME only when the UE supports a capability of being handed over from the LTE network to the CS domain of the 2G or 3G network and the enodeB also determines that the voice bearer whose QCI=1 exists, so as to trigger the handover of the UE from the LTE network to the CS domain of the 2G or 3G network.

The handover requirement message may be a message for requiring handover from the LTE network to a packet switched PS domain of the 2G or 3G network (for example, an LTE to 2G/3G PS HO Required message), a message for requiring the handover from the LTE network to the CS domain of the 2G or 3G network (for example, an LTE to 2G/3G SRVCC HO Required message), or a message for requiring handover from the LTE network to the PS domain and the CS domain of the 2G or 3G network (for example, an LTE to 2G/3G SRVCC and PS HO Required message).

The handover requirement message may include UE capability information that is used to indicate information about a frequency band supported by the UE, an access capability, and the like. For example, the UE capability information may be at least one of a classmark 2 and a classmark 3. In the prior art, when the UE does not support the handover from the LTE network to the CS domain of the 2G/3G network, the eNodeB does not send the UE capability information to the MME, and therefore, the MME does not have the UE capability information. After the MME acquires the UE capability information, the MME may send the UE capability information to an MSC, so that the MSC can perform handover to the CS domain of the 2G/3G In this embodiment of the present invention, the UE capability information may be transferred to the MME by using the handover requirement message.

The handover requirement message includes first indication information, where the first indication information is used to request the MME to hand over the UE from the LTE network to the CS domain of the 2G or 3G network for the CSFB; or the first indication information is used to request the MME to hand over the UE from the LTE network to the CS domain of the 2G or 3G network for the CSFB and is used to indicate that the UE supports the handover from the LTE network to the CS domain of the 2G or 3G network; or the handover requirement message includes a source-to-target transparent container, where the source-to-target transparent container includes second indication information, and the second indication information is used to request a base station on the 2G or 3G network to hand over the UE from the LTE network to the CS domain of the 2G or 3G network for the CSFB. The first indication information may be referred to as a CSFB indicator, an optimized CSFB indicator, an SRVCC-based CSFB indicator, an enhanced CSFB indicator, or an enhanced CSFB possibility indicator.

When the second indication information does not indicate that the UE supports the handover from the LTE network to the CS domain of the 2G or 3G network, the MME may consider by default that the UE supports the handover. When the first indication information does not indicate that the UE supports the handover from the LTE network to the CS domain of the 2G or 3G network, the base station on the 2G/3G network may consider by default that the UE supports the handover. The second indication information and the first indication information may be referred to as a CSFB indicator, an optimized CSFB indicator, an SRVCC-based CSFB indicator, an enhanced CSFB indicator, or an enhanced CSFB possibility indicator.

For example, the second indication information may include a CSFB indication field, or a CSFB indication field and a UE capability field. The CSFB indication field instructs the MME to hand over the UE from the LTE network to the circuit switched CS domain of the 2G or 3G network for the CSFB. The UE capability field indicates that the UE supports the handover from the LTE network to the PS domain of the 2G or 3G network.

The first indication information may include a CSFB indication field, or a CSFB indication field and a UE capability field. The CSFB indication field instructs the base station on the 2G/3G network to hand over the UE from the LTE network to the circuit switched CS domain of the 2G or 3G network for the CSFB. The UE capability field indicates that the UE supports the handover from the LTE network to the PS domain of the 2G or 3G network.

For example, in a case in which a target network is a UTRAN network, the eNodeB adds the second indication information to a source RNC to target RNC transparent container, where a CSFB information field in the existing source RNC to target RNC transparent container may be used as the CSFB indication field, and a field may be added to the source RNC to target RNC transparent container and used as the UE capability field; and in a case in which a target network is a GERAN network, the eNodeB adds the second indication information to old BSS to new BSS information, where the CSFB indication field or the UE capability field may be added to the old BSS to new BSS information.

S114. The MME determines that an IMS voice session of the UE does not exist and determines not to delete a bearer corresponding to the IMS voice session.

Specifically, the MME determines that the bearer whose QCI=1 does not exist, so as to determine that the IMS voice session of the UE does not exist. And the MME still sends a first handover request message to the MSC.

Further, because the bearer whose QCI=1 does not exist, the MME does not need to delete the bearer whose QCI=1.

That is because in the prior art, the MME can send the first handover request message to the MSC and at the same time delete the voice bearer whose QCI=1 only when an active IMS voice session currently exists, that is, when the MME determines that the voice bearer whose QCI=1 exists.

S115. The MME sends a first handover request message to an MSC, where the first handover request message is used to request the MSC to hand over the UE from the LTE network to the circuit switched CS domain of the second generation 2G or third generation 3G network for the CSFB.

Because the first handover request message is sent by the MME to the MSC, handover required in the first handover request message is the handover from the LTE network to the CS domain of the 2G or 3G network, that is, the first handover request message is a PS-to-CS handover request.

The first handover request message may carry third indication information, where the third indication information is used to request the MSC to hand over the UE from the LTE network to the CS domain of the 2G or 3G network for the CSFB, that is, the third indication information is used to indicate that the first handover request message is sent for the CSFB. The third indication information may further indicate that the UE supports the handover from the LTE network to the CS domain of the 2G or 3G network. Alternatively, the first handover request message may not indicate the CSFB. In this case, the MSC considers by default that the first handover request message is sent for the CSFB.

After the MME receives the UE capability information from the eNodeB, the first handover request message may carry the UE capability information; for example, the UE capability information is at least one of a classmark 2 and a classmark 3.

Because the UE does not support the handover from the LTE network to the CS domain of the 2G or 3G network, the UE does not report voice coding/decoding information supported by the UE. In this case, the MME may add default voice coding/decoding information to the first handover request message according to a target system of the handover.

The third indication information in the first handover request message may be referred to as a CSFB indicator, an optimized CSFB indicator (optimized CSFB indicator), a single radio voice call continuity (single radio voice call continuity, SRVCC)-based CSFB indicator (SRVCC based CSFB Indicator), an enhanced CSFB indicator (enhanced CSFB indicator), or an enhanced CSFB possibility indicator (enhanced CSFB possible).

When the first handover request message carries a session transfer number-single radio (Session Transfer Number-Single Radio, STN-SR), the MSC ignores the STN-SR number.

S120. The MME sends a second handover request message to an SGSN, where the second handover request message is used to request the SGSN to initiate handover from the LTE network to a packet switched PS domain of the 2G or 3G network.

When being handed over from the LTE network to the CS domain, the UE may be handed over to the PS domain at the same time, or may not be handed over to the PS domain at the same time. In this way, dependence of this solution on a network may be reduced, that is, an operator is required to support only the handover from the LTE network to the CS domain of the 2G or 3G network, and there is no need to force the operator to support the handover from the LTE network to the PS domain of the 2G or 3G network.

S121. The MSC sends a third handover request message to a base station, where the third handover request message is used to request the base station to allocate a CS domain resource to the UE for the handover to the CS domain of the 2G or 3G network.

The MSC determines, according to the first handover request message, not to initiate a session transfer process to an IP multimedia subsystem. Specifically, the MSC does not send an Invite message to an IMS system, so as to avoid triggering a session transfer process.

The third handover request message is further used to request the base station to hand over the user equipment UE from the Long Term Evolution LTE network to the circuit switched CS domain of the 2G or 3G network for the CSFB. The base station allocates the CS domain resource to the UE for the handover from the LTE network to the CS domain of the 2G or 3G network.

The MSC acquires PLMN information of the LTE network in a process in which the UE performs combined registration or from the first handover request message sent by the MME.

For example, the CS domain resource allocated by the base station includes a wired resource between the base station and the MSC and a radio resource between the base station and the UE.

For example, the third handover request message includes fifth indication information, where the fifth indication information is used to request the base station to hand over the UE from the LTE network to the CS domain for the CSFB; and/or the fifth indication information is used to indicate that the UE supports the handover from the LTE network to the CS domain of the 2G or 3G network.

The third handover request message includes a source-to-target transparent container, where the source-to-target transparent container includes the fifth indication information.

When the first handover request message does not include the voice coding/decoding information supported by the UE, the MSC sets default voice coding/decoding information according to a type of the 2G or 3G network, where the default voice coding/decoding information may be included in the third handover request message.

The third handover request message includes integrity protection information and/or encryption information, so that the base station sends a security mode command to the UE after receiving a handover complete message.

S125. The base station sends a third handover request response message to the MSC, where the third handover request response message includes information about the CS domain radio resource, and the information about the CS domain radio resource is used to hand over the UE from the LTE network to the CS domain of the 2G or 3G network.

S130. The MSC sends a first handover response message to the MME, where the first handover response message includes the information about the CS domain radio resource.

S135a. The MME sends a handover requirement response message to the eNodeB, where the handover requirement response message includes the information about the CS domain radio resource.

S135b. The eNodeB sends a handover command to the UE, where the handover command includes the information about the CS domain radio resource.

For example, the handover command includes fourth indication information, where the fourth indication information is used to instruct that the UE be handed over from the LTE network to the CS domain of the 2G or 3G network for the CSFB.

For example, the handover command further includes information about a PS domain resource, where the UE is handed over from the LTE network to the PS domain of the 2G or 3G network according to the information about the PS domain resource.

The handover command may be further used to instruct that the UE be handed over from the LTE network to the PS domain of the 2G or 3G network.

S140. The UE is handed over from the LTE network to the CS domain of the 2G or 3G network according to the handover command The UE is handed over from the LTE network to the CS domain of the 2G or 3G network for the CSFB by using the information about the resource that is included in the handover command The UE generates a third session in a process of the handover from the LTE network to the CS domain of the 2G or 3G network. Alternatively, the UE may not generate a session in the process of the handover from the LTE network to the CS domain of the 2G or 3G network.

When the information about the resource includes a CS encryption algorithm identifier, the UE activates CS domain encryption according to the CS encryption algorithm identifier in the process of the handover from the LTE network to the 2G or 3G network.

S145. After the handover is complete, the UE sends a handover complete (HO Complete) message to the base station (BSC or RNC).

The UE does not generate a session in the process of the handover from the LTE network to the CS domain of the 2G or 3G network for the CSFB.

Alternatively, in the process of the handover from the LTE network to the CS domain of the 2G or 3G network for the CSFB, the UE generates a session, and after the handover is complete, deletes the session.

Further, when the UE confirms that there is no IMS session currently, the session is deleted. Specifically, the process of the handover from the LTE network to the CS domain of the 2G or 3G network is merely for reserving a voice session resource for the CSFB. That is because if an IMS session exists currently, the IMS session needs to be converted into a session generated in the process of the handover from the LTE network to the CS domain of the 2G or 3G network.

After receiving the handover complete message, to respond to the handover complete message, the base station needs to add a location area identity (LAI) to UTRAN mobility information sent to the UE, which, in this embodiment, may cause the UE to initiate location area update (Location Area Update, LAU), and lead to a failure in setting up a CS call. To avoid the failure, the UTRAN mobility information sent by the base station to the UE may not carry the location area identity.

When sending the UTRAN mobility information in a subsequent process, the base station may send the LAI to the UE by using the following exemplary method:

(a) after receiving the handover complete message, the base station starts a timer, and when the timer expires, the base station sends the UTRAN mobility information, so as to send the LAI to the UE; or (b) after receiving a call IU release command (IU RELEASE COMMAND) or a call connection success (Connect) message, the base station sends the UTRAN mobility information, so as to send the LAI to the UE, where for an active call, the MSC sends a call connection success (Connect) message to the UE, and for a passive call, the UE sends a call connection success (Connect) message to the MSC.

Alternatively, when the UE sends an LAU message to the base station, to avoid a failure, the base station does not send the location area update request message to the MSC, but the base station sends a location area update accept message directly to the UE.

S150. The base station forwards the handover complete message in step S145 to the MSC.

S155. The UE sends a connection management service request (CM Service Request) to the MSC.

S160. The MSC sends an authentication request (Authenticate Request) to the UE.

Alternatively, this step S160 may not be executed, that is, the MSC does not send the authentication request message to the UE.

S165. The UE sends an authentication response (Authenticate Response) to the MSC.

S170. The MSC sends a security mode command to the base station, where the security mode command carries integrity protection information and/or encryption information (Encryption Information), so that the base station sends the security mode command to the UE.

Alternatively, this step S170 may not be executed, that is, the MSC does not send the security mode command to the base station.

S175. The base station sends the security mode command to the UE. Specifically, the base station executes this step according to the security mode command in step S170, or the base station executes this step after receiving the message in S145.

S180. Optionally, the MSC sends a connection management service accept command (CM service Accept) to the UE.

S185. The UE sends a first CS call connection setup request message (Setup) to the MSC, where the first CS call connection setup request message is used to request the MSC to generate a first session for the CSFB. Alternatively, the first CS call connection setup request message is used to request the MSC to generate the third session for the CSFB.

S195. The MSC performs call peer end processing.

S196. The MSC sends an alerting (Alerting) message to the UE. The UE waits for an answer message from the peer end.

Further, a called party picks up a phone to enter a conversation state.

After a call ends, because the call is triggered by the CSFB, the UE needs to return to the LTE network after the call is complete. According to the third handover request message, the base station determines that the call is triggered by the CSFB. Therefore, after the base station on the 2G/3G network receives a call release message sent by the MSC, the base station on the 2G/3G network redirects the UE to the LTE network or the base station hands over the UE to the LTE network, where the call release message is a release command Iu Release Command or a clear command Clear Command It should be noted that in this embodiment, the base station can parse CS signaling between the UE and the MSC. The base station receives a signaling message sent by the UE to the MSC, where for example, the connection management service request, the authentication response, the first CS call connection setup request message, and the like. The base station may send the signaling message to the MSC through a connection that is set up in the process of the handover from the LTE network to the CS domain of the 2G or 3G network, or send the signaling message to the MSC by using a direct transfer message.

In this embodiment, the indication information included in the notification message, the first indication information, the second indication information, the third indication information, the fourth indication information, and the fifth indication information may include a CSFB indication field, or a CSFB indication field and a UE capability field. The CSFB indication field instructs the MME, the MSC, or the base station on the 2G/3G network to hand over the UE from the LTE network to the circuit switched CS domain of the 2G or 3G network for the CSFB. The UE capability field indicates that the UE supports the handover from the LTE network to the PS domain of the 2G or 3G network.

In FIG. 1, in a process of implementing circuit switched fallback, handover from an LTE network to a 2G or 3G network is triggered. Even though an IMS voice session does not exist on the networks, UE can be handed over directly from the LTE network to a CS domain of the 2G or 3G network. Therefore, a resource is allocated on a network side to the UE for the handover from the LTE network to the CS domain of the 2G or 3G network, which avoids allocation of a CS domain resource for the CSFB after the UE is handed over from the LTE network to a PS domain of the 2G or 3G network or is redirected to the 2G or 3G network, and reduces an access delay of accessing the CS domain of the 2G or 3G network by the UE. In addition, further, by determining that an IMS voice session does not exist, it is identified that the handover of the UE from the LTE network to the CS domain of the 2G or 3G network is triggered by the CSFB, so as to ensure that the handover from the LTE network to the CS domain of the 2G or 3G network is properly performed.

Figure 2:
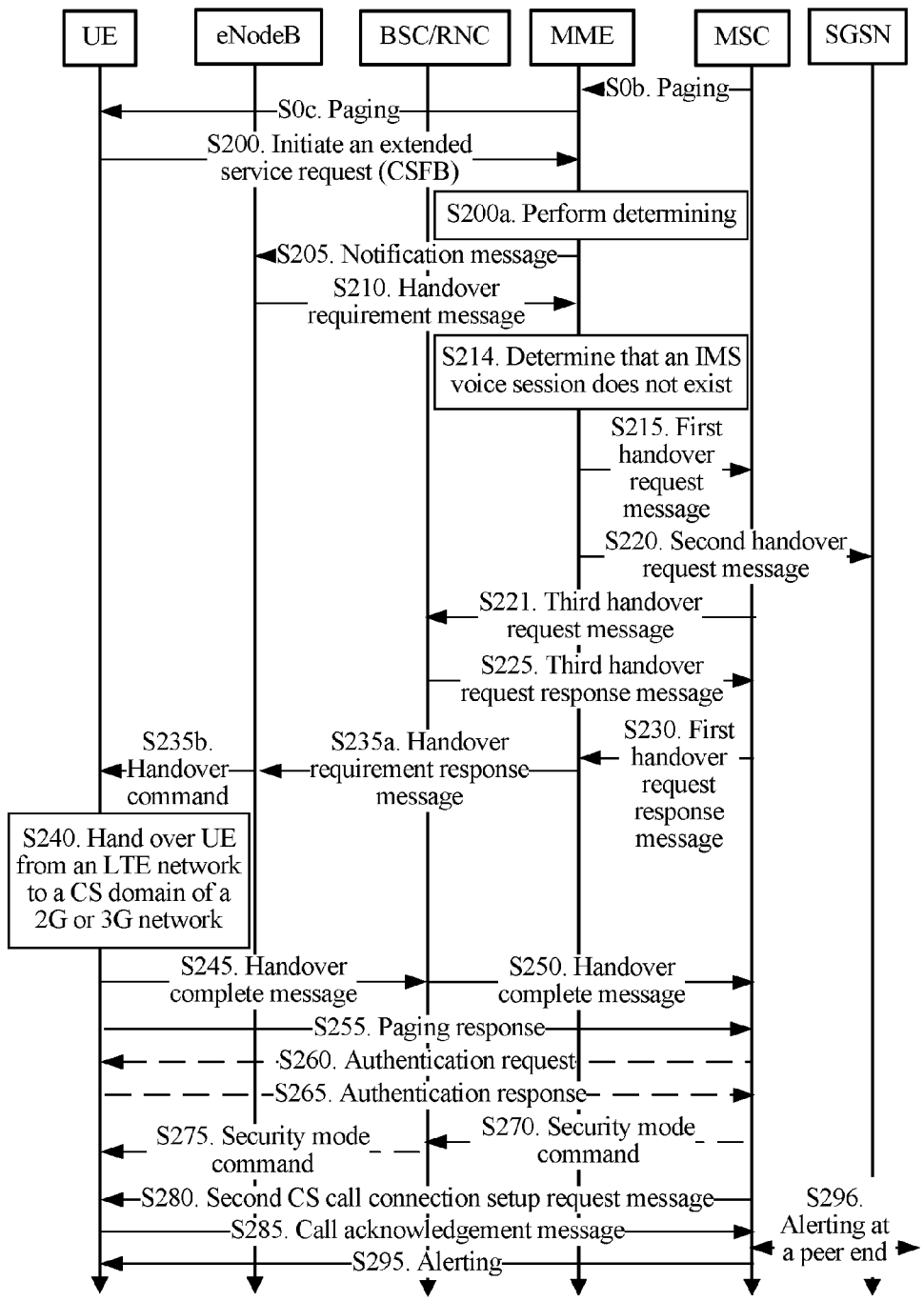
FIG. 2 is a schematic diagram of another embodiment of a network handover method according to an embodiment of the present invention.

Referring to FIG. 2, FIG. 2 shows a network handover process and a passive call process after the network handover according to an embodiment of the present invention.

S0b and S0c: An MSC sends a CS paging request to an MME, and the MME triggers a paging process.

Steps S200 to S250 are the same as steps S100 to S150 in FIG. 1, and details are not described herein again.

S255. The UE sends a paging response to the MSC.

S260. The MSC sends an authentication request to the UE.

Alternatively, this step S260 may not be executed, that is, the MSC does not send the authentication request message to the UE.

S265. The UE sends an authentication response to the MSC.

S270. The MSC sends a security mode command to the base station, where the security mode command carries integrity protection information (Integrity Protection Information) and/or encryption information (Encryption Information), so that the base station sends the security mode command to the UE.

Alternatively, this step S270 may not be executed, that is, the MSC does not send the security mode command to the base station.

S275. The base station sends the security mode command to the UE. Specifically, the base station executes this step according to the security mode command in step S270, or the base station executes this step after receiving the message in S245.

S280. The MSC sends a second CS call connection setup request message to the UE, where the second CS call connection setup request message is used to request the UE to generate a second session for the CSFB.

After a step of receiving, by the UE, the second CS call connection setup request message sent by the mobile switching center MSC, the method further includes:

receiving or sending, by the UE, session data of the second session by using the resource.

S285. The MSC receives a call acknowledgement message sent by the UE.

S295. The MSC sends an alerting (Alerting) message to the UE. The UE enters a conversation state.

S296. The MSC triggers alerting at a peer end.

After a call ends, because the call is triggered by the CSFB, the UE needs to return to the LTE network after the call is complete. According to the third handover request message, the base station determines that the call is triggered by the CSFB. Therefore, after the base station on the 2G/3G network receives a call release message sent by the MSC, the base station on the 2G/3G network redirects the UE to the LTE network or the base station hands over the UE to the LTE network, where the call release message is a release command Iu Release Command or a clear command Clear Command.

It should be noted that in this embodiment, the base station can parse CS signaling between the UE and the MSC. The base station receives a signaling message sent by the UE to the MSC, where for example, the call acknowledgement message, the authentication response, the second CS call connection setup request message, and the like. The base station may send the signaling message to the MSC through a connection that is set up in the process of the handover from the LTE network to the CS domain of the 2G or 3G network, or send the signaling message to the MSC by using a direct transfer message.

In this embodiment, the indication information included in the notification message, the second indication information, the third indication information, the fourth indication information, and the fifth indication information may include a CSFB indication field, or a CSFB indication field and a UE capability field. The CSFB indication field instructs the MME to hand over the UE from the LTE network to the circuit switched CS domain of the 2G or 3G network for the CSFB. The UE capability field indicates that the UE supports the handover from the LTE network to the PS domain of the 2G or 3G network.

In this embodiment provided in the present invention, in a process of implementing circuit switched fallback, handover from an LTE network to a 2G or 3G network is triggered, and UE can be handed over directly from the LTE network to a CS domain of the 2G or 3G network. Therefore, a resource is allocated on a network side to the UE for the handover from the LTE network to the CS domain of the 2G or 3G network, which avoids allocation of a CS domain resource for the CSFB after the UE is handed over from the LTE network to a PS domain of the 2G or 3G network or is redirected to the 2G or 3G network, reduces an access delay of accessing the CS domain of the 2G or 3G network by the UE, shortens entire voice call duration, and improves user experience. In addition, further, by determining that an IMS voice session does not exist, it is identified that the handover of the UE from the LTE network to the CS domain of the 2G or 3G network is triggered by the CSFB, so as to ensure that handover from the LTE network is properly performed.

In the foregoing two application scenarios, an entire network handover and session process is described from two separate perspectives: the UE as a caller and the UE as a callee.

Figure 3:
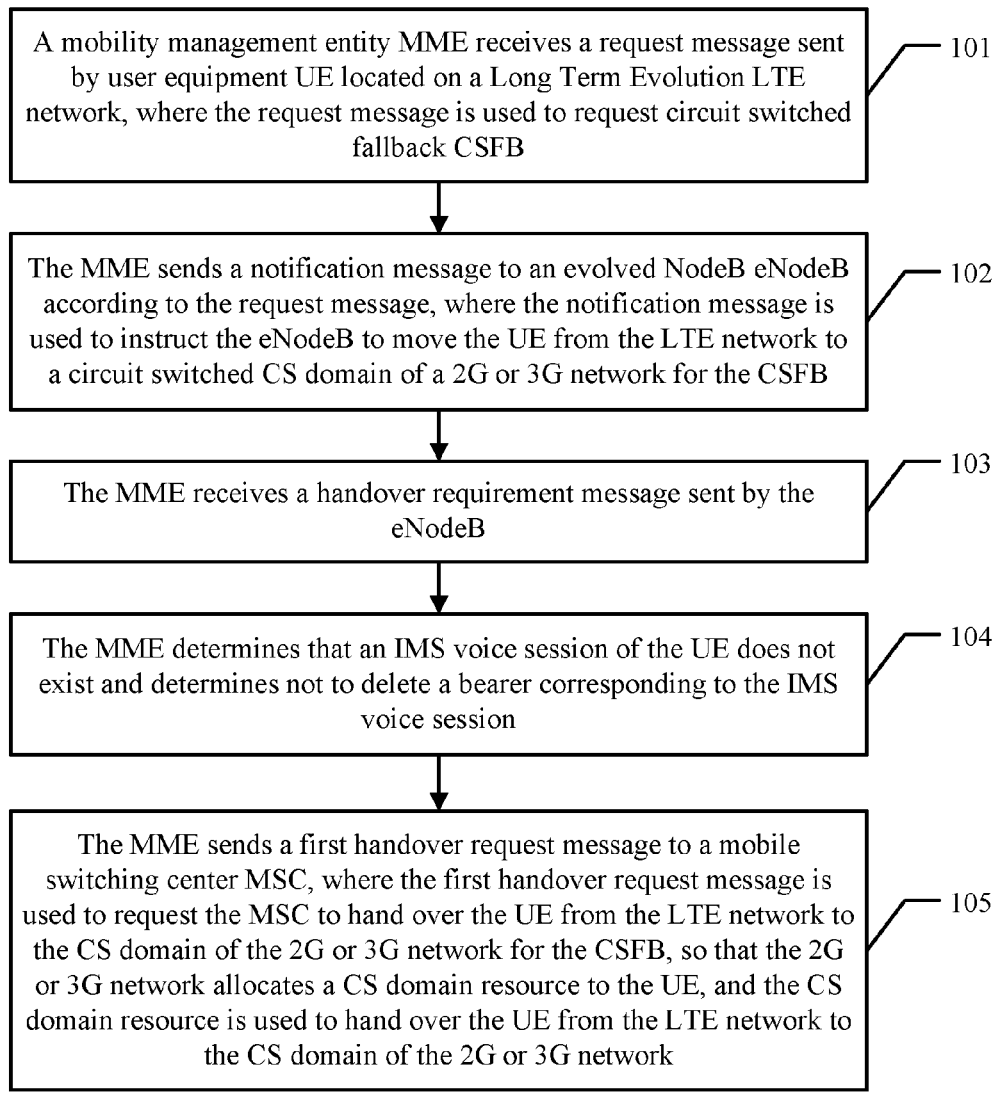
FIG. 3 is a schematic diagram of another embodiment of a network handover method according to an embodiment of the present invention.

Referring to FIG. 3, an embodiment of a network handover method provided in an embodiment of the present invention includes the following steps:

101. A mobility management entity MME receives a request message sent by user equipment UE located on a Long Term Evolution LTE network, where the request message is used to request circuit switched fallback CSFB.

The request message may be an extended service request message.

102. The MME sends a notification message to an evolved NodeB eNodeB according to the request message, where the notification message is used to instruct the eNodeB to move the UE from the LTE network to a circuit switched CS domain of a 2G or 3G network for the CSFB.

103. The MME receives a handover requirement message sent by the eNodeB.

104. The MME determines that an IMS voice session of the UE does not exist and determines not to delete a bearer corresponding to the IMS voice session.

105. The MME sends a first handover request message to a mobile switching center MSC, where the first handover request message is used to request the MSC to hand over the UE from the LTE network to the CS domain of the 2G or 3G network for the CSFB, so that the 2G or 3G network allocates a CS domain resource to the UE, and the CS domain resource is used to hand over the UE from the LTE network to the CS domain of the 2G or 3G network.

For the detailed description of the foregoing processing steps and another processing step of the MME in this embodiment, reference may be made to the description in the embodiment corresponding to FIG. 1 or FIG. 2, and details are not described herein again.

Figure 4:
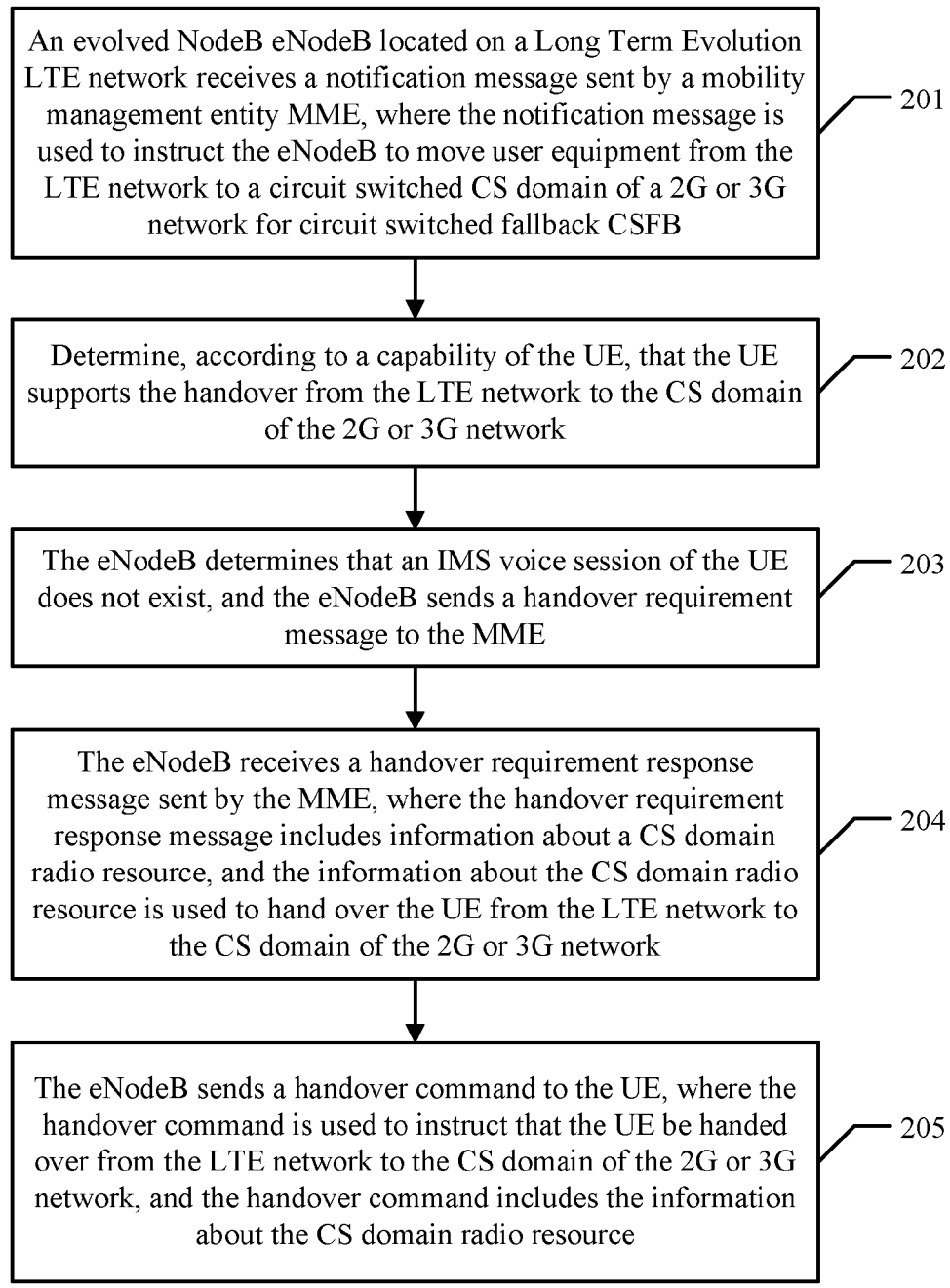
FIG. 4 is a schematic diagram of another embodiment of a network handover method according to an embodiment of the present invention.

Referring to FIG. 4, another embodiment of a network handover method provided in an embodiment of the present invention includes the following steps:

201. An evolved NodeB eNodeB located on a Long Term Evolution LTE network receives a notification message sent by a mobility management entity MME, where the notification message is used to instruct the eNodeB to move user equipment from the LTE network to a circuit switched CS domain of a 2G or 3G network for circuit switched fallback CSFB.

202. Determine, according to a capability of the UE, that the UE supports the handover from the LTE network to the CS domain of the 2G or 3G network.

203. The eNodeB determines that an IMS voice session of the UE does not exist, and the eNodeB sends a handover requirement message to the MME.

204. The eNodeB receives a handover requirement response message sent by the MME, where the handover requirement response message includes information about a CS domain radio resource, and the information about the CS domain radio resource is used to hand over the UE from the LTE network to the CS domain of the 2G or 3G network.

205. The eNodeB sends a handover command to the UE, where the handover command is used to instruct that the UE be handed over from the LTE network to the CS domain of the 2G or 3G network, and the handover command includes the information about the CS domain radio resource.

For the detailed description of the foregoing processing steps and another processing step of the evolved NodeB in this embodiment, reference may be made to the description in the embodiment corresponding to FIG. 1 or FIG. 2, and details are not described herein again.

Figure 5:
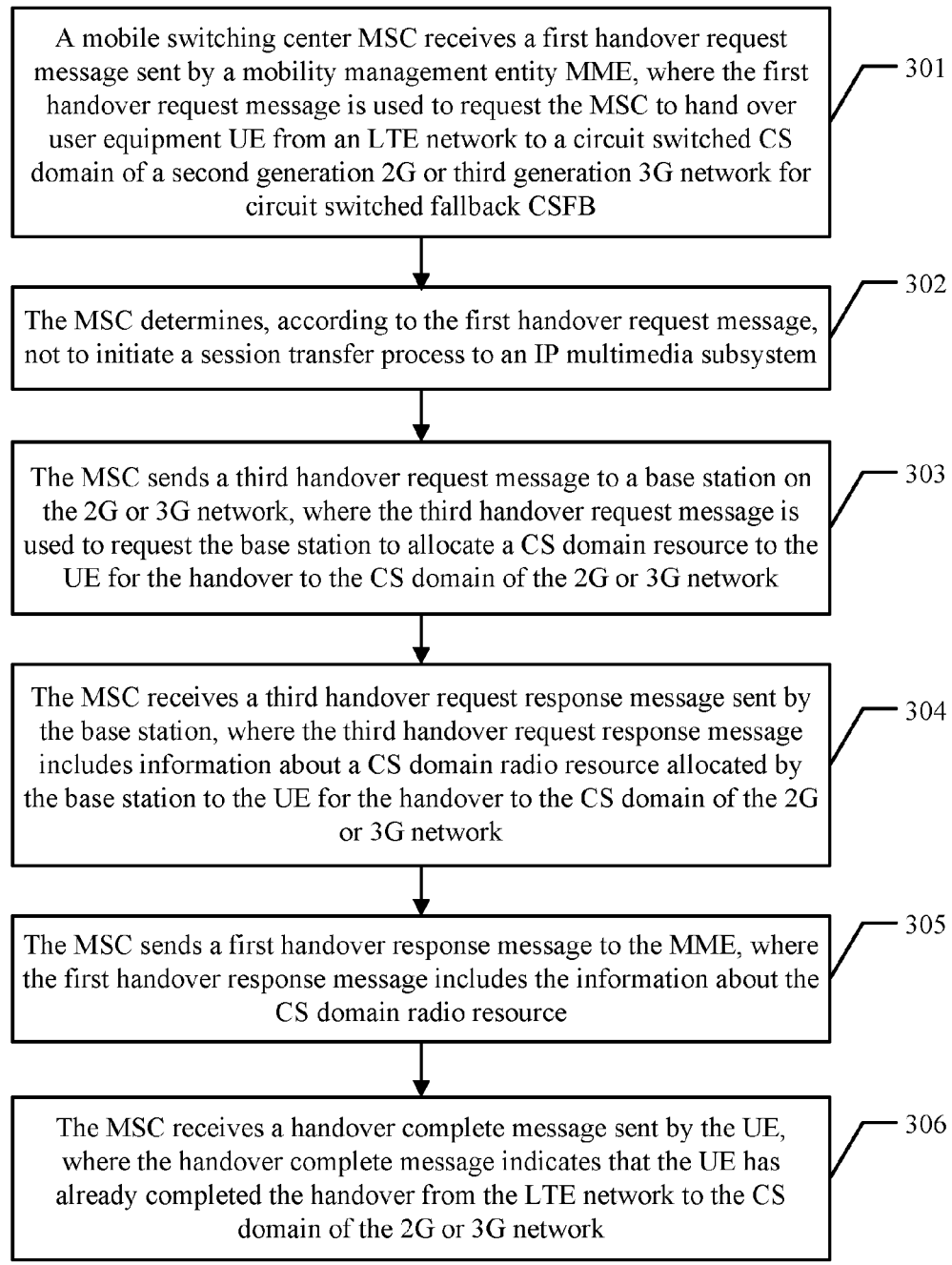
FIG. 5 is a schematic diagram of another embodiment of a network handover method according to an embodiment of the present invention.

Referring to FIG. 5, another embodiment of a network handover method provided in an embodiment of the present invention includes the following steps:

301. A mobile switching center MSC receives a first handover request message sent by a mobility management entity MME, where the first handover request message is used to request the MSC to hand over user equipment UE from an LTE network to a circuit switched CS domain of a second generation 2G or third generation 3G network for circuit switched fallback CSFB.

302. The MSC determines, according to the first handover request message, not to initiate a session transfer process to an IP multimedia subsystem.

303. The MSC sends a third handover request message to a base station on the 2G or 3G network, where the third handover request message is used to request the base station to allocate a CS domain resource to the UE for the handover to the CS domain of the 2G or 3G network.

304. The MSC receives a third handover request response message sent by the base station, where the third handover request response message includes information about a CS domain radio resource allocated by the base station to the UE for the handover to the CS domain of the 2G or 3G network.

305. The MSC sends a first handover response message to the MME, where the first handover response message includes the information about the CS domain radio resource.

306. The MSC receives a handover complete message sent by the UE, where the handover complete message indicates that the UE has already completed the handover from the LTE network to the CS domain of the 2G or 3G network.

The method in this embodiment may further include the following step:

receiving, by the MSC, a first CS call connection setup request message sent by the UE, where the first CS call connection setup request message is used to request the MSC to generate a first session for the CSFB. This step is an active call process of the UE.

The method in this embodiment may further include the following step: sending, by the MSC, a second CS call connection setup request message to the UE, where the second CS call connection setup request message is used to request the UE to generate a second session for the CSFB. This step is a passive call process of the UE.

For the detailed description of the foregoing processing steps and another processing step of the UE in this embodiment, reference may be made to the description in the embodiment corresponding to FIG. 1 or FIG. 2, and details are not described herein again.

Figure 6:
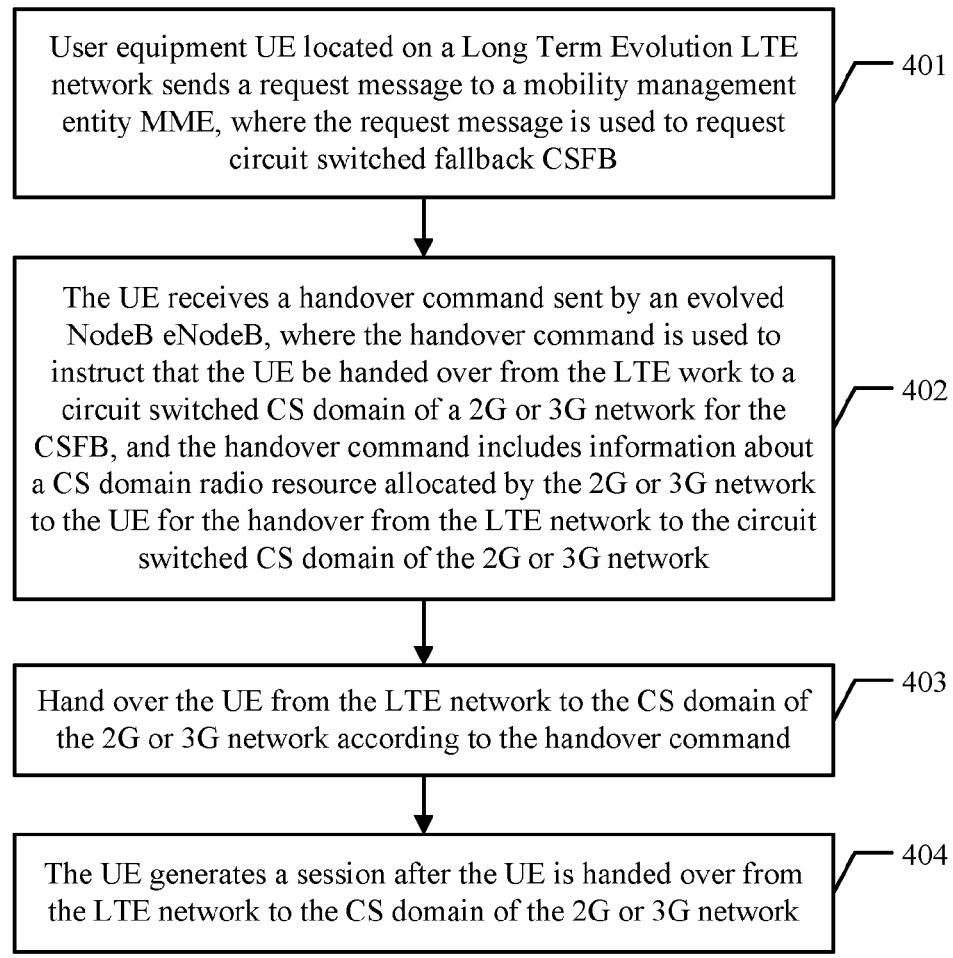
FIG. 6 is a schematic diagram of another embodiment of a network handover method according to an embodiment of the present invention.

Referring to FIG. 6, another embodiment of a network handover method provided in an embodiment of the present invention includes the following steps:

401. User equipment UE located on a Long Term Evolution LTE network sends a request message to a mobility management entity MME, where the request message is used to request circuit switched fallback CSFB.

The request message may be an extended service request.

402. The UE receives a handover command sent by an evolved NodeB eNodeB, where the handover command is used to instruct that the UE be handed over from the LTE network to a circuit switched CS domain of a 2G or 3G network for the CSFB, and the handover command includes information about a CS domain radio resource allocated by the 2G or 3G network to the UE for the handover from the LTE network to the circuit switched CS domain of the 2G or 3G network.

403. Hand over the UE from the LTE network to the CS domain of the 2G or 3G network according to the handover command.

404. The UE generates a session after the UE is handed over from the LTE network to the CS domain of the 2G or 3G network.

The method shown in FIG. 6 may further include:

sending, by the UE in the CS domain, a first CS call connection setup request message to a mobile switching center MSC, where the first CS call connection setup request message is used to request the MSC to generate a first session for the CSFB. This step is an active call process.

The method shown in FIG. 6 may further include: receiving, by the UE in the CS domain, a second CS call connection setup request message sent by the MSC, where the second CS call connection setup request message is used to request the UE to generate a second session for the CSFB. This step is a passive call process.

For the detailed description of the foregoing processing steps and another processing step of the UE in this embodiment, reference may be made to the description in the embodiment corresponding to FIG. 1 or FIG. 2, and details are not described herein again.

Figure 7:
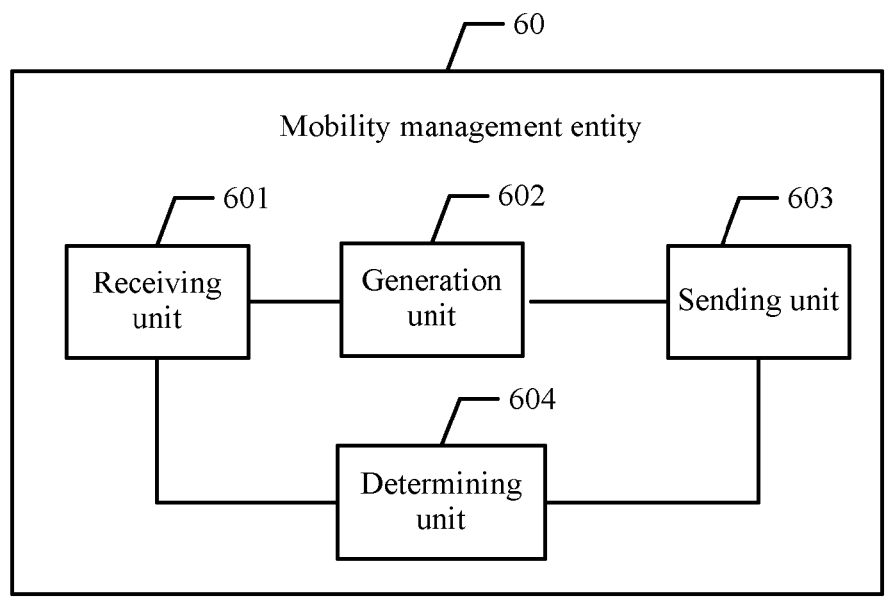
FIG. 7 is a schematic diagram of an embodiment of a mobility management entity according to an embodiment of the present invention.

Referring to FIG. 7, a mobility management entity MME 60 provided in an embodiment of the present invention includes: a receiving unit 601, a generation unit 602, a sending unit 603, and a determining unit 604.

The receiving unit 601 is configured to receive a request message sent by user equipment UE located on a Long Term Evolution LTE network, where the request message is used to request circuit switched fallback CSFB.

The generation unit 602 is configured to generate a notification message according to the request message received by the receiving unit 601, where the notification message is used to instruct an evolved NodeB eNodeB to move the UE from the LTE network to a circuit switched CS domain of a second generation 2G or third generation 3G network for the CSFB.

The sending unit 603 is configured to send the notification message generated by the generation unit 602 to the eNodeB.

The determining unit 604 is configured to determine that an IMS voice session of the UE does not exist and determine not to delete a bearer corresponding to the IMS voice session.

The receiving unit 601 is further configured to receive a handover requirement message sent by the eNodeB.

The generation unit 602 is further configured to generate a first handover request message according to the handover requirement message received by the receiving unit 601, where the first handover request message is used to request an MSC to hand over the UE from the LTE network to the CS domain of the 2G or 3G network for the CSFB.

The sending unit 603 is further configured to: when the determining unit determines that the IMS voice session of the UE does not exist, send the first handover request message generated by the generation unit to the mobile switching center MSC, so that the 2G or 3G network allocates a CS domain resource to the UE, where the CS domain resource is used to hand over the UE from the LTE network to the CS domain of the 2G or 3G network.

The determining unit 604 is further configured to determine that the LTE network and the 2G or 3G network support the handover of the UE from the LTE network to the CS domain of the 2G or 3G network for the CSFB and the UE supports the handover from the LTE network to the CS domain of the 2G or 3G network.

The receiving unit 601 is further configured to receive a first handover response message that is sent by the MSC to respond to the first handover request message, where the first handover response message includes information about a CS domain radio resource allocated by a base station on the 2G or 3G network to the UE.

The generation unit 602 is further configured to generate a handover requirement response message according to the handover requirement message received by the receiving unit 601, where the handover requirement response message includes the information about the CS domain radio resource, and the information about the CS domain radio resource is used to hand over the UE from the LTE network to the CS domain of the 2G or 3G network for the CSFB.

The sending unit 603 is further configured to send the handover requirement response message generated by the generation unit 602 to the eNodeB.

The mobility management entity in this embodiment can implement the method steps of the MME described in the method embodiments in FIG. 1, FIG. 2, and FIG. 3. The receiving unit 601 is configured to receive a message sent by another entity to the MME, and the sending unit 603 is configured to send a message to another entity. Persons skilled in the art may understand, according to the steps executed in the method embodiments, an action of and an action executed by each unit and a relationship between the units in the MME.

Figure 8:
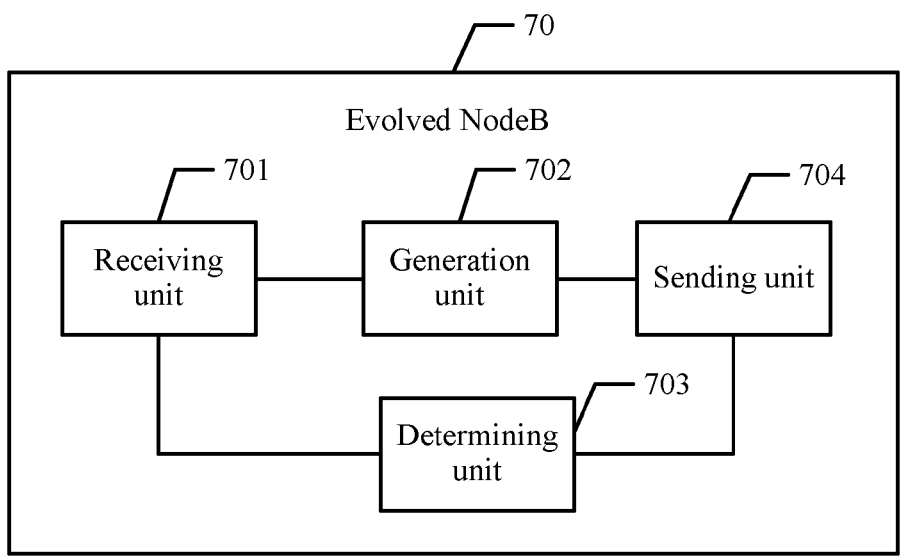
FIG. 8 is a schematic diagram of an embodiment of an evolved NodeB according to an embodiment of the present invention.

Referring to FIG. 8, an evolved NodeB 70 provided in an embodiment of the present invention includes: a receiving unit 701, a generation unit 702, a determining unit 703, and a sending unit 704.

The receiving unit 701 is configured to receive a notification message sent by a mobility management entity MME, where the notification message is used to instruct the eNodeB to move user equipment UE from a Long Term Evolution LTE network to a circuit switched CS domain of a 2G or 3G network for circuit switched fallback CSFB.

The generation unit 702 is configured to generate a handover requirement message according to the notification message received by the receiving unit 701.

The determining unit 703 is configured to determine, according to a capability of the UE, that the UE supports the handover from the LTE network to the CS domain of the 2G or 3G network.

The determining unit 703 is further configured to determine that an IMS voice call of the UE does not exist.

The sending unit 704 is configured to: when the determining unit 703 determines that the IMS voice session of the UE does not exist, send the handover requirement message generated by the generation unit 702 to the MME.

The receiving unit 701 is further configured to receive a handover requirement response message sent by the MME, where the handover requirement response message includes information about a CS domain radio resource, and the information about the CS domain radio resource is used to hand over the UE from the LTE network to the CS domain of the 2G or 3G network.

The generation unit 702 is further configured to generate a handover command according to the handover requirement response message received by the receiving unit 701, where the handover command is used to instruct that the UE be handed over from the LTE network to the CS domain of the 2G or 3G network, and the handover command includes the information about the CS domain radio resource.

The sending unit 704 is further configured to send the handover command generated by the generation unit 702 to the UE.

The determining unit 703 is further configured to determine, by determining that a bearer whose QoS class identifier equals to 1 does not exist in the UE, that the IMS voice session of the UE does not exist.

The determining unit 703 is further configured to determine that the UE supports handover from the LTE network to a PS domain of the 2G or 3G network, where the handover command is further used to instruct that the UE be handed over from the LTE network to the PS domain of the 2G or 3G network, the handover command includes information about a PS domain resource of the 2G or 3G network, and the information about the PS domain resource is used to hand over the UE from the LTE network to the PS domain of the 2G or 3G network.

When a handover requirement is a requirement of handing over from the LTE network to the CS domain and the PS domain of the 2G or 3G network, the handover command is further used to instruct that the UE be handed over from the LTE network to the PS domain of the 2G or 3G network, the handover command includes the information about the PS domain resource of the 2G or 3G network, and the information about the PS domain resource is used to hand over the UE from the LTE network to the PS domain of the 2G or 3G network.

The evolved NodeB in this embodiment can implement the method steps of the evolved NodeB described in the method embodiments in FIG. 1, FIG. 2, and FIG. 4. The receiving unit 701 is configured to receive a message sent by another entity to the evolved NodeB, and the sending unit 704 is configured to send a message to another entity. Persons skilled in the art may understand, according to the steps executed in the method embodiments, an action of and an action executed by each unit and a relationship between the units in the evolved NodeB.

Figure 9:
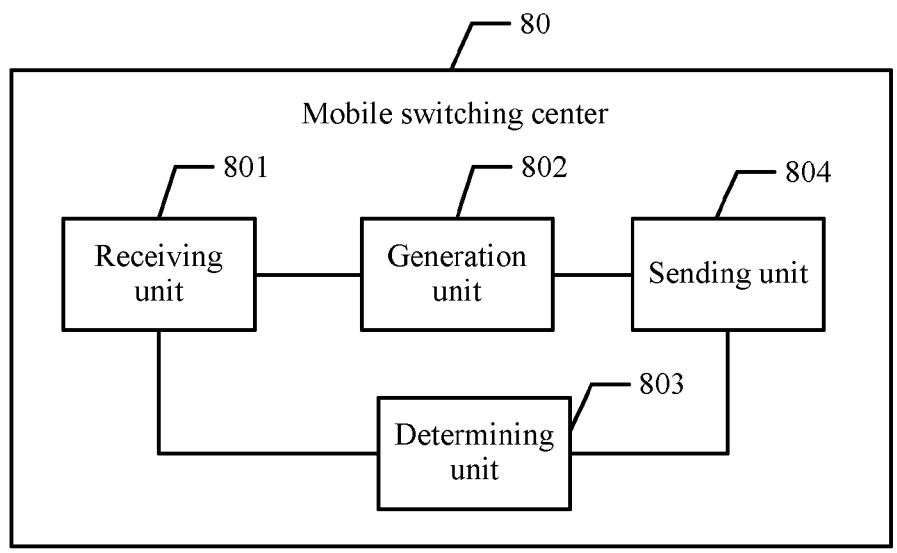
FIG. 9 is a schematic diagram of an embodiment of a mobile switching center according to an embodiment of the present invention.

Referring to FIG. 9, a mobile switching center MSC 80 provided in an embodiment of the present invention includes: a receiving unit 801, a generation unit 802, a determining unit 803, and a sending unit 804.

The receiving unit 801 is configured to receive a first handover request message sent by a mobility management entity MME, where the first handover request message is used to request the MSC to hand over user equipment UE from an LTE network to a circuit switched CS domain of a second generation 2G or third generation 3G network for circuit switched fallback CSFB.

The generation unit 802 is configured to generate a third handover request message according to the first handover request message received by the receiving unit 801, where the third handover request message is used to request a base station on the 2G or 3G network to allocate a CS domain resource to the UE for the handover to the CS domain of the 2G or 3G network.

The determining unit 803 is configured to determine, according to the first handover request message received by the receiving unit 801, not to initiate a session transfer process to an IP multimedia subsystem.

The sending unit 804 is configured to send the third handover request message generated by the generation unit 802 to the base station.

The receiving unit 801 is further configured to receive a third handover request response message sent by the base station, where the third handover request response message includes information about a CS domain radio resource allocated by the base station to the UE for the handover to the CS domain of the 2G or 3G network.

The generation unit 802 is further configured to generate a first handover response message according to the first handover request message received by the receiving unit 801, where the first handover response message includes the information about the CS domain radio resource.

The sending unit 804 is further configured to send the first handover response message generated by the generation unit 802 to the MME.

The receiving unit 801 is further configured to receive a handover complete message sent by the UE, where the handover complete message indicates that the UE has already completed the handover from the LTE network to the CS domain of the 2G or 3G network.

The receiving unit 801 is further configured to receive a first CS call connection setup request message sent by the UE, where the first CS call connection setup request message is used to request the MSC to generate a first session.

The sending unit 804 is further configured to send a second CS call connection setup request message to the UE, where the second CS call connection setup request message is used to request the UE to generate a second session.

The sending unit 804 is further configured to send a session release message to the UE after the receiving unit receives the first CS call connection setup request message, where the session release message is used to request the UE to release a third session generated by the UE in a process of the handover from the LTE network to the CS domain of the 2G or 3G network.

The sending unit 804 is further configured to send a session release message to the UE after the receiving unit receives a call acknowledgement message, where the session release message is used to request the UE to release a third session generated by the UE in the process of the handover from the LTE network to the CS domain of the 2G or 3G network.

The MSC in this embodiment can implement the method steps of the MSC described in the method embodiments in FIG. 1, FIG. 2, and FIG. 5. The receiving unit 801 is configured to receive a message sent by another entity to the MSC, and the sending unit 804 is configured to send a message to another entity. Persons skilled in the art may understand, according to the steps executed in the method embodiments, an action of and an action executed by each unit and a relationship between the units in the MSC.

Figure 10:
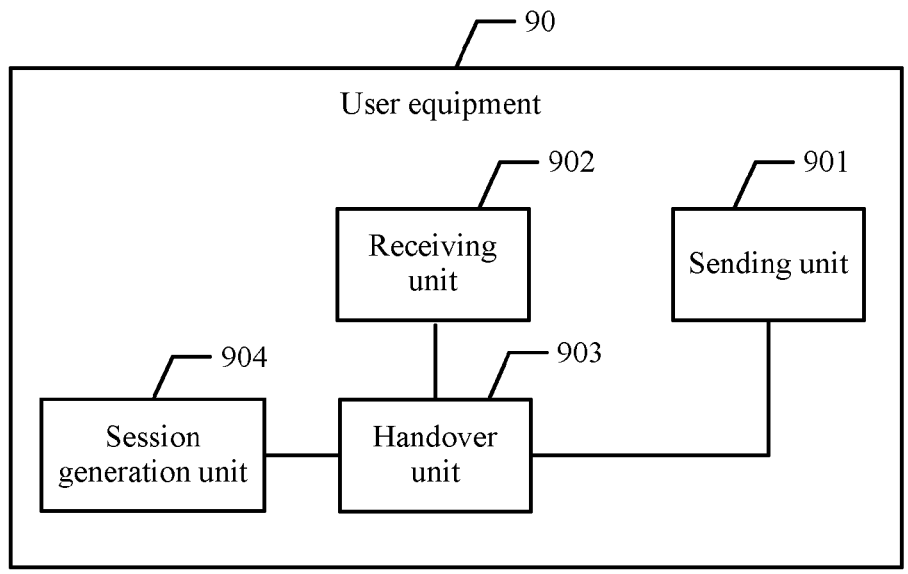
FIG. 10 is a schematic diagram of an embodiment of user equipment according to an embodiment of the present invention.

Referring to FIG. 10, user equipment 90 provided in an embodiment of the present invention includes: a sending unit 901, a receiving unit 902, a handover unit 903, and a session generation unit 904.

The sending unit 901 is configured to send a request message to a mobility management entity MME, where the request message is used to request circuit switched fallback CSFB.

The receiving unit 902 is configured to receive a handover command sent by an evolved NodeB eNodeB, where the handover command is used to instruct that the UE be handed over from a Long Term Evolution LTE network to a circuit switched CS domain of a 2G or 3G network for the CSFB, and the handover command includes information about a CS domain radio resource allocated by the 2G or 3G network to the UE for the handover from the LTE network to the CS domain of the 2G or 3G network.

The handover unit 903 is configured to hand over from the LTE network to the CS domain of the 2G or 3G network according to the information about the resource that is received by the receiving unit 902.

The session generation unit 904 is configured to generate a session after the handover unit 903 hands over from the LTE network to the CS domain of the 2G or 3G network.

The sending unit 901 is further configured to send a CS call connection setup request message to a mobile switching center MSC, where the CS call connection setup request message is used to request the MSC to generate a session.

The session generation unit 904 is configured to generate the session after the receiving unit 902 receives the CS call connection setup request message sent by the MSC.

The UE in this embodiment can implement the method steps of the UE described in the method embodiments in FIG. 1, FIG. 2, and FIG. 6. The receiving unit 902 is configured to receive a message sent by another entity to the UE, and the sending unit 901 is configured to send a message to another entity. Persons skilled in the art may understand, according to the steps executed in the method embodiments, an action of and an action executed by each unit and a relationship between the units in the UE.

Persons skilled in the art can understand that in the embodiments in FIG. 7 to FIG. 10, the sending unit used to send a message may be implemented by a transmitter, and the receiving unit used to receive a message may be implemented by a receiver. Alternatively, both the sending unit and the receiving unit may be implemented by a transceiver. In physical implementation, the transmitter or the transceiver may be implemented by one physical entity or by multiple physical entities, and the transmitter and the transceiver may be implemented by one physical entity or by multiple physical entities, which is not limited in the present invention. Other units such as the generation unit, an allocation unit, a redirection unit, the handover unit, the determining unit, and the like may be implemented by one or more processors, which is not limited in the present invention.

Figure 11:
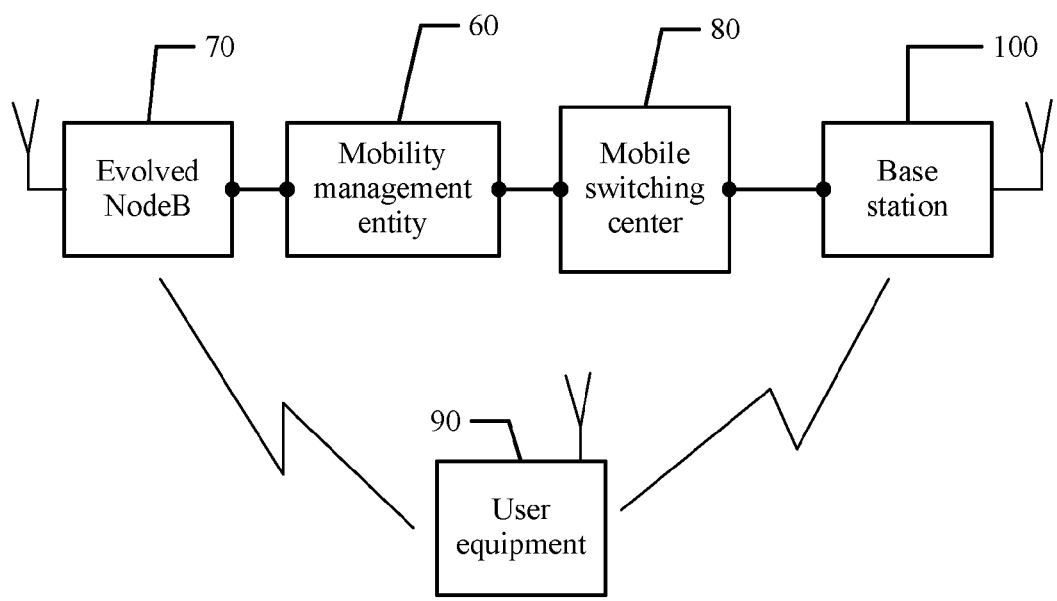
FIG. 11 is a schematic diagram of an embodiment of a network system according to an embodiment of the present invention.

Referring to FIG. 11, an embodiment of a network handover system provided in an embodiment of the present invention includes: a mobility management entity 60, an evolved NodeB 70, a mobile switching center 80, a base station 100, and user equipment 90.

For actions executed by and interactions between the mobility management entity 60, the evolved NodeB 70, the mobile switching center 80, the base station 100, and the user equipment 90, reference may be made to the descriptions about FIG. 1 and FIG. 2 and descriptions about the method embodiments and the apparatus embodiments in FIG. 3 to FIG. 10, and details are not described herein again.

Persons of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The LTE network mentioned in the present invention includes an LTE A network and subsequent possible LTE versions.

The foregoing descriptions are merely specific embodiments of the present invention, but are not intended to limit the protection scope of the present invention. Any modification or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A network handover method, comprising:
receiving, by a mobility management entity (MME), a request message sent by user equipment (UE) located on a Long Term Evolution (LTE) network, wherein the request message is used to request circuit switched fallback (CSFB);
sending, by the MME, a notification message to an evolved NodeB (eNodeB) according to the request message, wherein the notification message is used to instruct the eNodeB to move the UE from the LTE network to a circuit switched (CS) domain of a second generation (2G) or third generation (3G) network for the CSFB;
receiving, by the MME, a handover requirement message sent by the eNodeB;
determining, by the MME, that an IMS voice session of the UE does not exist; and
sending, by the MME, a first handover request message to a mobile switching center (MSC), wherein the first handover request message is used to request the MSC to hand over the UE from the LTE network to the CS domain of the 2G or 3G network for the CSFB, so that the 2G or 3G network allocates a CS domain resource to the UE, and the CS domain resource is used to hand over the UE from the LTE network to the CS domain of the 2G or 3G network.

2. The method according to claim 1, further comprising:
receiving, by the MME, a first handover response message that is sent by the MSC to respond to the first handover request message, wherein the first handover response message comprises information about a CS domain radio resource allocated by a base station on the 2G or 3G network to the UE; and
sending, by the MME, a handover requirement response message to the eNodeB, wherein the handover requirement response message comprises the information about the CS domain radio resource, and the information about the CS domain radio resource is used to hand over the UE from the LTE network to the CS domain of the 2G or 3G network for the CSFB.

3. A network handover method, comprising:
receiving, by an evolved NodeB (eNodeB) located on a Long Term Evolution (LTE) network, a notification message sent by a mobility management entity (MME), wherein the notification message is used to instruct the eNodeB to move user equipment (UE) from the LTE network to a circuit switched CS domain of a 2G or 3G network for circuit switched fallback (CSFB);
determining, according to a capability of the UE, that the UE supports the handover from the LTE network to the CS domain of the 2G or 3G network;
determining, by the eNodeB, that an IMS voice session of the UE does not exist, and sending, by the eNodeB, a handover requirement message to the MME;
receiving, by the eNodeB, a handover requirement response message sent by the MME, wherein the handover requirement response message comprises information about a CS domain radio resource, and the information about the CS domain radio resource is used to hand over the UE from the LTE network to the CS domain of the 2G or 3G network; and
sending, by the eNodeB, a handover command to the UE, wherein the handover command is used to instruct that the UE be handed over from the LTE network to the CS domain of the 2G or 3G network, and the handover command comprises the information about the CS domain radio resource.

4. The method according to claim 3, wherein the determining, by the eNodeB, that an IMS voice session of the UE does not exist comprises:
determining, by the eNodeB by determining that a bearer whose QoS class identifier equals to 1 does not exist in the UE, that the IMS voice session of the UE does not exist.

5. A network handover method, comprising:
receiving, by a mobile switching center (MSC), a first handover request message sent by a mobility management entity (MME), wherein the first handover request message is used to request the MSC to hand over user equipment (UE) from a Long Term Evolution (LTE) network to a circuit switched (CS) domain of a second generation (2G) or third generation (3G) network for circuit switched fallback (CSFB);

determining, by the MSC according to the first handover request message, not to initiate a session transfer process to an IP multimedia subsystem;

sending, by the MSC, a third handover request message to a base station on the 2G or 3G network, wherein the third handover request message is used to request the base station to allocate a CS domain resource to the UE for the handover to the CS domain of the 2G or 3G network;

receiving, by the MSC, a third handover request response message sent by the base station, wherein the third handover request response message comprises information about a CS domain radio resource allocated by the base station to the UE for the handover to the CS domain of the 2G or 3G network;

sending, by the MSC, a first handover response message to the MME, wherein the first handover response message comprises the information about the CS domain radio resource; and receiving, by the MSC, a handover complete message sent by the UE, wherein the handover complete message indicates that the UE has already completed the handover from the LTE network to the CS domain of the 2G or 3G network.

6. The method according to claim 5, the first handover request message is further used to indicate that the UE supports the handover from the LTE network to the CS domain of the 2G or 3G network.

7. The method according to claim 5, further comprising:
receiving, by the MSC, a first CS call connection setup request message sent by the UE, wherein the first CS call connection setup request message is used to request the MSC to generate a first session.

8. The method according to claim 7, wherein the method further comprises:
sending, by the MSC after receiving the first CS call connection setup request message, a session release message to the UE, wherein the session release message is used to request the UE to release a third session generated by the UE in a process of the handover from the LTE network to the CS domain of the 2G or 3G network.

9. The method according to claim 5, further comprising:
sending, by the MSC, a second CS call connection setup request message to the UE, wherein the second CS call connection setup request message is used to request the UE to generate a second session.

10. The method according to claim 9, wherein the method further comprises:
sending, by the MSC after receiving a call acknowledgement message that responds to the second CS call connection setup request message, a session release message to the UE, wherein the session release message is used to request the UE to release a third session generated by the UE in a process of the handover from the LTE network to the CS domain of the 2G or 3G network.

11. A mobility management entity (MME), comprising:
a receiver, configured to receive a request message sent by user equipment (UE) located on a Long Term Evolution (LTE) network, wherein the request message is used to request circuit switched fallback (CSFB);

a processor, configured to generate a notification message according to the request message received by the receiver, wherein the notification message is used to instruct an evolved NodeB (eNodeB) to move the UE from the LTE network to a circuit switched (CS) domain of a second generation (2G) or third generation (3G) network for the CSFB;

a transmitter, configured to send the notification message generated by the generation unit to the eNodeB; and the processor is further configured to determine that an IMS voice session of the UE does not exist and determine not to delete a bearer corresponding to the IMS voice session, wherein the receiver is further configured to receive a handover requirement message sent by the eNodeB;

the processor is further configured to generate a first handover request message according to the handover requirement message received by the receiver, wherein the first handover request message is used to request an mobile switching center (MSC) to hand over the UE from the LTE network to the CS domain of the 2G or 3G network for the CSFB; and the transmitter is further configured to: when the processor determines that the IMS voice session of the UE does not exist, send the first handover request message generated by the processor to the MSC, so that the 2G or 3G network allocates a CS domain resource to the UE, wherein the CS domain resource is used to hand over the UE from the LTE network to the CS domain of the 2G or 3G network.

12. An evolved NodeB (eNodeB), comprising:
a receiver, configured to receive a notification message sent by a mobility management entity (MME), wherein the notification message is used to instruct the eNodeB to move user equipment (UE) from a Long Term Evolution (LTE) network to a circuit switched (CS) domain of a 2G or 3G network for circuit switched fallback (CSFB);

a processor, configured to generate a handover requirement message according to the notification message received by the receiver; and determine, according to a capability of the UE, that the UE supports the handover from the LTE network to the CS domain of the 2G or 3G network, wherein the processor is further configured to determine that an IMS voice session of the UE does not exist; and a transmitter, configured to: when the processor determines that the IMS voice session of the UE does not exist, send the handover requirement message generated by the processor to the MME; wherein the receiver is further configured to receive a handover requirement response message sent by the MME, wherein the handover requirement response message comprises information about a CS domain radio resource, and the information about the CS domain radio resource is used to hand over the UE from the LTE network to the CS domain of the 2G or 3G network;

the processor is further configured to generate a handover command according to the handover requirement response message received by the receiver, wherein the handover command is used to instruct that the UE be handed over from the LTE network to the CS domain of the 2G or 3G network, and the handover command comprises the information about the CS domain radio resource; and the transmitter is further configured to send the handover command generated by the processor to the UE.

13. The evolved NodeB according to claim 12, wherein:
the processor is further configured to determine, by determining that a bearer whose QoS class identifier equals to 1 does not exist in the UE, that the IMS voice session of the UE does not exist.

14. A mobile switching center (MSC), comprising:
a receiver, configured to receive a first handover request message sent by a mobility management entity (MME), wherein the first handover request message is used to request the MSC to hand over user equipment (UE) from a Long Term Evolution (LTE) network to a circuit switched (CS) domain of a second generation (2G) or third generation (3G) network for circuit switched fallback (CSFB);
a processor, configured to generate a third handover request message according to the first handover request message received by the receiver, wherein the third handover request message is used to request a base station on the 2G or 3G network to allocate a CS domain resource to the UE for the handover to the CS domain of the 2G or 3G network; and determine, according to the first handover request message received by the receiver, not to initiate a session transfer process to an IP multimedia subsystem; and
a transmitter, configured to send the third handover request message generated by the processor to the base station, wherein
the receiver is further configured to receive a third handover request response message sent by the base station, wherein the third handover request response message comprises information about a CS domain radio resource allocated by the base station to the UE for the handover to the CS domain of the 2G or 3G network;
the processor is further configured to generate a first handover response message according to the first handover request message received by the receiver, wherein the first handover response message comprises the information about the CS domain radio resource;
the transmitter is further configured to send the first handover response message generated by the processor to the MME; and
the receiver is further configured to receive a handover complete message sent by the UE, wherein the handover complete message indicates that the UE has already completed the handover from the LTE network to the CS domain of the 2G or 3G network.

15. The mobile switching center according to claim 14, wherein:
the receiver is further configured to receive a first CS call connection setup request message sent by the UE, wherein the first CS call connection setup request message is used to request the MSC to generate a first session.

16. The mobile switching center according to claim 15, wherein:
the transmitter is further configured to send a session release message to the UE after the receiver receives the first CS call connection setup request message, wherein the session release message is used to request the UE to release a third session generated by the UE in a process of the handover from the LTE network to the CS domain of the 2G or 3G network.

17. The mobile switching center according to claim 14, wherein:
the transmitter is further configured to send a second CS call connection setup request message to the UE, wherein the second CS call connection setup request message is used to request the UE to generate a second session.

18. The mobile switching center according to claim 14, the first handover request message is further used to indicate that the UE supports the handover from the LTE network to the CS domain of the 2G or 3G network.

* * * * *

UNITED STATES PATENT AND TRADEMARK OFFICE
CERTIFICATE OF CORRECTION

PATENT NO. : 9,826,440 B2
APPLICATION NO. : 15/142455
DATED : November 21, 2017
INVENTOR(S) : Xiaobo Wu et al.

Page 1 of 1

It is certified that error appears in the above-identified patent and that said Letters Patent is hereby corrected as shown below:

On the Title Page

Item [71] (Applicant), Line 5:
Delete "TECHNOIOGIES" and insert -- TECHNOLOGIES --, therefore.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*